(12) United States Patent
Teshima et al.

(10) Patent No.: US 6,433,083 B2
(45) Date of Patent: *Aug. 13, 2002

(54) AROMATIC VINYL RESIN MATERIAL AND MOLDED PRODUCTS THEREOF

(75) Inventors: Hideo Teshima; Tomoaki Takebe; Masanori Sera, all of Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/773,904

(22) Filed: Feb. 2, 2001

Related U.S. Application Data

(63) Continuation of application No. 09/177,559, filed on Oct. 23, 1998, now Pat. No. 6,207,753.

(30) Foreign Application Priority Data

Oct. 24, 1997 (JP) ............................................. 9-292347

(51) Int. Cl.$^7$ ............................................. C08G 63/91
(52) U.S. Cl. .................. 525/70; 525/242; 525/245; 525/247; 526/335; 526/336; 526/339; 526/340; 526/156
(58) Field of Search .................... 525/70, 242, 245, 525/247; 526/335, 336, 339, 340, 156

(56) References Cited

U.S. PATENT DOCUMENTS 4,327,201 A   4/1982   Kennedy et al.
5,362,814 A   11/1994  Machida et al.

OTHER PUBLICATIONS

Patent Abstracts of Japan, vol. 18, No. 97 (C–1167), Feb. 17, 1994, JP 5–295056, Nov. 9, 1993.

*Primary Examiner*—Rachel Gorr
(74) *Attorney, Agent, or Firm*—Oblon, Spivak, McClelland, Maier & Neustadt, P.C.

(57) ABSTRACT

The present invention provides resin materials for producing molded products endowed with excellent heat resistance, solvent resistance, toughness, tensile elongation, and transparency. Specifically, there are provided aromatic vinyl resin materials which have the following properties: Storage elasticity values $G'(1.0)$ and $G'(0.1)$ as measured at 300° C., a strain $\gamma$ of 20%, and a frequency of 1.0 Hz or 0.1 Hz satisfy the expression, $\log[G'(1.0)/G'(0.1)] \leq 0.6$, the heat of fusion $\Delta H$ as measured over the range 200–295° C. is 8 to 50 (J/g), and the $^1$H-NMR peak integrated values for the fraction corresponding to the temperature range of not lower than 50° C., as collected from temperature rising election fraction on the Soxhlet extraction residue by use of cyclohexane or o-dichlorobenzene, satisfy the relation $[1.8–2.1 \text{ (ppm)}]/[1.0–1.7 \text{(ppm)}]<0.49$.

11 Claims, No Drawings

AROMATIC VINYL RESIN MATERIAL AND MOLDED PRODUCTS THEREOF

This application is a continuation of U.S. Ser. No. 09/177,559, filed Oct. 23, 1998 and issued as U.S. Pat. No. 6,207,753.

BACKGROUND OF THE INVENTION

1. Field of the Invention

The present invention relates to an aromatic vinyl resin material and an aromatic vinyl resin molded product, and more particularly to an aromatic vinyl resin material that is endowed with excellent heat resistance, solvent resistance, toughness, tensile elongation, and transparency, and to an aromatic vinyl resin molded product thereof.

2. Related Art

Previously, the present inventors successfully developed a styrene polymer having a high syndiotacticity (Japanese Patent Application Laid-Open (kokai) Nos. 62-104818, 63-241009). The styrene polymer having a syndiotactic structure (hereinafter simply referred to as "syndiotactic polystyrene" or "SPS") is endowed with excellent heat resistance and solvent resistance, but does not exhibit sufficient toughness or elongation. In addition, it has poor compatibility with other resins; therefore its use has inevitably been limited. When SPS is used for producing a film that requires transparency, SPS is cooled rapidly from the molten state to acquire transparency. However, the thus-obtained film has a drawback in that it is brittle.

In order to overcome this drawback, the present inventors succeeded in endowing the aforementioned styrene polymer having a syndiotactic structure with toughness by copolymerizing styrene with an olefin (Japanese Patent Application Laid-Open (kokai) Nos. 3-7705, 4-130114, 4-300904).

However, the thus-obtained random or block copolymer of styrene and an olefin suffers insufficient controllability of the copolymerization composition as well as a low copolymerization-modification ratio (i.e., percentage of modifier olefins in the resultant copolymer), leading to insufficient improvement in toughness, elongation, and compatibility with other resins.

There have been proposed a large number of compositions in which a rubber-like elastic substance or thermoplastic resin is added to SPS (Japanese Patent Application Laid-Open (kokai) Nos. 01-146944 and 01-279944). However, due to lack of an effective compatibility-enhancing agent, dispersion of thermoplastic resin or the like is insufficient, resulting in deterioration in transparency.

There have also been proposed graft copolymers in which a styrene monomer is graft-copolymerized with a polymer bearing double bonds in side chains, as well as block copolymers in which a styrene monomer is block-copolymerized with a macromonomer bearing polymerization-active terminal vinyl groups (Japanese Patent Application Laid-Open (kokai) Nos. 05-247147 and 05-295056). However, the copolymers disclosed in the above publications are inhomogeneous in copolymer composition and exhibit insufficient graft ratio, resulting in insufficient improvement in targeted properties such as toughness, elongation, and impact resistance.

In view of the foregoing, an object of the present invention is to provide an aromatic vinyl resin material for producing a molded product which is endowed with heat resistance, solvent resistance, toughness, tensile elongation, and transparency, as well as to provide a molded product of the resin material.

SUMMARY OF THE INVENTION

The present inventors carried out extensive studies, and as a result, found that toughness of a certain resin material is related to frequency dependency of storage modulus of the material and that the heat of fusion $\Delta H$ over a certain temperature range and the amount of graft components present in the polymer are related to good toughness, elongation, and transparency, thus achieving the present invention.

Specifically, the present invention provides:

(1) an aromatic vinyl resin material which satisfies the relationship represented by the following expression:

$$SG \text{ value} = \log[G'(1.0)/G'(0.1)] < 0.6$$

wherein $G'(1.0)$ is a storage modulus as measured at a temperature of 300° C., a strain $\gamma$ of 20%, and a frequency of 1.0 Hz, and $G'(0.1)$ is a storage modulus as measured at a temperature of 300° C., a strain $\gamma$ of 20%, and a frequency of 0.1 Hz;

(2) an aromatic vinyl resin material having the following properties:

1) the heat of fusion $\Delta H$ as measured over the range 200–295° C. with a differential scanning calorimeter is 8 to 50 (J/g), 2) in $^1$H-NMR performed on the residue obtained from Soxhlet extraction using cyclohexane, $$B/A < 0.49$$

wherein A is an integrated value of a peak appearing at 1.0–1.7 (ppm) and B is an integrated value of a peak appearing at 1.8–2.1 (ppm), and 3) a tensile elongation of not less than 5%;

(3) an aromatic vinyl resin material having the following properties:

1) the heat of fusion $\Delta H$ as measured over the range 200–295° C. with a differential scanning calorimeter is 8 to 50 (J/g), 2) in 1H-NMR performed on the fraction eluted at 50° C. or higher through temperature rising election fraction by use of o-dichlorobenzene (hereinafter referred to simply as fractionation by o-dichlorobenzene), B/A<0.49 wherein A is an integrated value of a peak appearing at 1.0–1.7 (ppm) and B is an integrated value of a peak appearing at 1.8–2.1 (ppm), and 3) a tensile elongation of not less than 5%;

(4) an aromatic vinyl resin material as described above in any of (1) to (3), wherein the aromatic vinyl resin material is a graft copolymerization product of an aromatic vinyl monomer (a) and an ethylene copolymer macromer (b);

(5) an aromatic vinyl resin material as described above in (4), in which the ethylene copolymer macromer (b) is a copolymerization product of ethylene, a diene monomer, and an optional aromatic vinyl monomer and optional α-olefin;

(6) an aromatic vinyl resin material as described above in any of (1) to (3), which has a composition composed of (A) an aromatic vinyl polymer, (B) an ethylene copolymer having a diene-monomer-derived vinyl group in the molecular chain, and (C) a graft copolymerization product of an aromatic vinyl monomer (a) and an ethylene copolymer macromer (b);

(7) an aromatic vinyl resin material as described above in any of (4) to (6), in which a moiety derived from an aromatic vinyl monomer predominantly has a syndiotactic structure;

(8) an aromatic vinyl resin material having a composition composed of an aromatic vinyl resin material as described above in any of (1) to (7) and a styrene polymer predominantly having a syndiotactic structure and/or a rubber-like elastic substance; and (9) a molded product obtained through molding of an aromatic vinyl resin material as described above in any of (1) to (8)

DESCRIPTION OF THE PREFERRED EMBODIMENTS

Embodiments of the present invention will next be described.

1. Aromatic Vinyl Resin Material (1) An aromatic vinyl resin material according to the present invention is such that the storage modulus (G'(1.0)) as measured at a temperature of 300° C., a strain γ of 20%, and at a frequency of 1.0 Hz and the storage modulus (G'(0.1)) as measured at a temperature of 300° C., a strain γ of 20%, and at a frequency of 0.1 Hz satisfy the relationship represented by the following expression.

$$SG \text{ value} = \log[G'(1.0)/G'(0.1)] \leq 0.6$$

wherein the storage modulus G' (dyne/cm$^2$) is measured at a temperature of 300° C., a strain γ of 20%, and a frequency ranging from $10^{-2}$ Hz to $10^2$ Hz through use of cone plate type rheometer (manufactured by Rheometric Scientific). G' (1.0) denotes a G' value as measured at a frequency of 1.0 Hz. A test piece for measurement is manufactured in the following manner. Briefly, a sample to be measured is pelletized at 300° C. through use of a small-size kneader. The resultant pellets are pressed into a sheet (1.0 mm thick) at 300° C., obtaining a test piece.

(2) An aromatic vinyl resin material according to the present invention has the following properties:

1) The heat of fusion ΔH as measured over the range 200–295° C. with a differential scanning calorimeter is 8 to 50 (J/g), preferably 10 to 40 (J/g), more preferably 15 to 30 (J/g).

The heat of fusion ΔH as measured over the range 200–295° C. with a differential scanning calorimeter is specifically obtained in the following manner. A differential scanning calorimeter to be used is of model DSC7 manufactured by Perkin-Elmer Corp. Ten milligrams of a sample are heated to melt in a nitrogen atmosphere at 300° C. for 5 minutes. The resulting melt is cooled to 50° C. at a cooling rate of 20° C./min and held at this temperature for 1 minute. Subsequently, the sample is heated at a rate of 20° C./min, obtaining a melting endothermic curve. Based on the-obtained curve, the heat of fusion over the range 200–295° C. is calculated. When the heat of fusion ΔH is less than 8 (J/g), heat resistance and solvent resistance may deteriorate. When the heat of fusion ΔH is in excess of 50 (J/g), toughness may deteriorate.

2) In $^1$H-NMR performed on the residue obtained in Soxhlet extraction using cyclohexane: B/A<0.49, preferably B/A<0.45, more preferably B/A<0.40 (wherein A is an integrated value of a peak appearing at 1.0–1.7 (ppm) and B is an integrated value of a peak appearing at 1.8–2.1 (ppm)).

3) Tensile elongation is not less than 5%, preferably not less than 10%, more preferably not less than 20%.

Tensile elongation is obtained in the following manner. A sample is press-formed at 300° C. and then cooled through use of a cold press (die temperature: 30° C.), thereby obtaining film having a thickness of 100 μm. The film is annealed at 150° C. for 3 hours and then cooled to room temperature. A tensile test piece having a dumbbell shape is blanked out from the film through use of a blanking die having the S3 size of DIN53504. The test piece is subjected to a tensile test through use of Autograph AG5000B (manufactured by Shimadzu corp.) under the following conditions: initial distance between chucks: 20 mm; and pulling rate: 1 mm/min.

A tensile elongation less than 5% indicates that toughness of a resin-molded product is relatively low.

(3) An aromatic vinyl resin material according to the present invention has the following properties.

1) The heat of fusion ΔH as measured over the range 200–295° C. through use of a differential scanning calorimeter is 8 to 50 (J/g), preferably 10 to 40 (J/g), more preferably 15 to 30 (J/g).

2) In $^1$H-NMR performed on the fraction eluted at 50° C. or higher through fractionation by use of o-dichlorobenzene, B/A<0.49, preferably B/A<0.45, more preferably B/A<0.40 (wherein A is an integrated value of a peak appearing at 1.0–1.7 (ppm) and B is an integrated value of a peak appearing at 1.8–2.1 (ppm)).

It will suffice so long as at least either the residue obtained in Soxhlet extraction using cyclohexane or the fraction eluted at 50° C. or higher in fractionation using o-dichlorobenzene satisfies the above requirement for B/A. When B/A is not less than 0.49, toughness may deteriorate.

Preferably, in $^1$H-NMR performed on the fraction eluted at 110° C. or higher through fractionation using o-dichlorobenzene, the relation B/A<0.49 is satisfied. More preferably, in $^1$H-NMR performed on the fraction eluted at 125° C. or higher through fractionation using o-dichlorobenzene, the relation B/A<0.49 is satisfied.

The fraction eluted at T° C. or higher in fractionation using c-dichlorobenzene (ODCB) is obtained in the following manner. Briefly, 250 milliliters of CDCB is added to 20 g of sample. The resultant mixture is heated to about 150° C. and completely dissolved. Subsequently, the resultant solution is placed in a silica gel column and then cooled to 30° C. at a cooling rate of 5° C./hour. Next, while letting ODCB flow at a rate of 10 milliliters/rain, temperature is raised to T° C. At a constant temperature of T° C., the polymer is eluted for separation. Then, temperature is raised to 135° C. so as to completely elute the polymer. The polymer eluted over the temperature range T-135° C. is precipitated in methanol and recovered. The thus-collected polymer serves as the fraction eluted at T° C. or higher in the fractionation.

$^1$H-NMR data were obtained through use of the NMR apparatus, model JNM-EX400, manufactured by JEOL LTD., under the following conditions: solvent: 1,2,4-trichlorobenzene/benzene $d_6$=4/1; temperature of sample: 130° C.; accumulation: 256; pulse angle: 45 degrees; and pulse interval: 9 sec.

3) Tensile elongation is not less than 5%, preferably not less than 10%, more preferably not less than 20%.

Tensile elongation is obtained in the following manner. A sample is press-formed at 300° C. and then cooled with a cold press (die temperature: 30° C.), to thereby obtain film having a thickness of 100 μm. The film is annealed at 150° C. for 3 hours and then cooled to room temperature. A tensile test piece having a dumbbell shape is blanked out from the film through use of a blanking die having the S3 size of DIN53504. The test piece is subjected to a tensile test through use of Autograph AG5000B (manufactured by Shiradzu Corp.) under the following conditions: initial distance between chucks: 20 mm; pulling rate: 1 mm/min.

A tensile elongation less than 5% indicates that toughness of a resin-molded product is relatively low.

(4) Preferably, an aromatic vinyl resin material according to the present invention has the following properties:

1) Internal haze is not greater than 70%, preferably not greater than 55%, more preferably not greater than 40%.

Internal haze is measured in the following manner. A sample is press-formed at 300° C. and then immediately immersed into ice water for rapid cooling, to thereby obtain a rapidly cooled film having a thickness of 25 μm. The film is measured for internal haze according to JIS K7105. In this case, silicone oil is applied to one side of each of two glass plates, and the film is sandwiched between the oil-applied surfaces. A measured value is corrected on the basis of a blank value as measured without the film being interposed between the surfaces.

An internal haze in excess of 70% indicates that transparency is relatively low.

2) The average size of domain component grains obtained by a light scattering method is 0.1 μm to 3 μm, preferably 0.05 μm to 2 μm, more preferably 0.1 μm to 1 μm.

The average size of domain component grains is obtained in the following manner. A sample is press-formed at 300° C. and then immediately immersed into ice water for rapid cooling, thereby obtaining a rapidly cooled film having a thickness of 25 μm. A He—Ne laser beam having a wavelength (λ) of 633 nm is made to impinge onto the film. Scattered light from the film is measured through use of a photodiode array primary detector to thereby obtain scattered light intensity distribution I as a function of scattering angle (θ). The natural logarithm of I(θ), lnI(θ), is plotted with respect to $(4\pi n/\lambda)^2 \sin(\theta/2)^2$ to thereby obtain an absolute value Ai of initial inclination. Based on $R=(3Ai)^{1/2}$, the domain component's grain size (R) is calculated.

2. Specific Embodiments of Aromatic Vinyl Resin Material

Specific embodiments of the aromatic vinyl resin material according to the present invention are not particularly limited. However, the following embodiments (I) to (III) are preferred.

(I) A graft copolymerization product of an aromatic vinyl monomer (a) and an ethylene copolymer macromer (b), in which the ethylene copolymer macromer (b) is a copolymer of ethylene, a diene monomer, an optional aromatic vinyl monomer, and an optional α-olefin.

(II) An aromatic vinyl resin composition composed of (A) an aromatic vinyl polymer, (B) an ethylene copolymer having a diene-monomer-derived vinyl group in the molecular chain, and (C) a graft copolymerization product of an aromatic vinyl monomer (a) and an ethylene copolymer macromer (i.e., corresponding to the above copolymer of (I)).

(III) An aromatic vinyl resin composition composed of an aromatic vinyl resin material as described above in (I) or (II) and a styrene polymer predominantly having a syndiotactic structure and/or a rubber-like elastic material.

The above-mentioned cases (I) through (III) will next be described in detail.

(I) A graft copolymerization product of an aromatic vinyl monomer (a) and an ethylene copolymer macromer (b):

(I-1) An example aromatic vinyl monomer (a) is represented by the following formula (1):

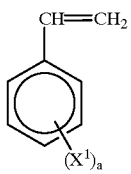

(1)

wherein $X^1$ represents a member which falls within the following cases 1), 2), or 3): 1) a hydrogen atom, 2) a halogen atom, 3) a substituent which contains at least one species selected from among a carbon atom, a tin atom, or a silicon atom; a represents an integer between 1 and 5 inclusive, wherein when a $\geq 2$, $X^1$ may be identical to or different from one another. Specifically, mention may be given of styrene; alkylstyrenes such as p-methylstyrene, m-methylstyrene, o-methyltyrene, 2,4-dimethylstyrene, 2,5-dimethylstyrene, 3,4-dimethylstyrene, 3,5-dimethylstyrene, p-ethylstyrene, m-ethylstyrene, and p-tert-butylstyrene; halogenated styrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene, and o-methyl-p-fluorostyrene; alkoxystyrenes such as methoxystyrene, ethoxystyrene, and t-butoxystyrene; vinylbiphenyls; vinylphenylnaphthalenes; vinylphenylanthracenes; halovinylbiphenyls; trialkylsilylvinylbiphenyls; halogen-substituted alkylstyrenes; alkylsilylstyrenes; phenyl-group-containing silylstyrenes; halosilylstyrenes; and silyl-group-containing silyl styrenes. Mixtures of two or more of these members are also usable. In addition, vinylnaphthalenes, vinylanthracenes, and their substituents may also be used.

(I-2) Ethylene Copolymer Macromer (b)

The ethylene copolymer macromer (b) is a copolymerization product obtained by subjecting ethylene, a diene monomer, an optional aromatic vinyl monomer, and optional α-olefin to copolymerization reaction. The macromer (b) is thus an ethylene copolymer primarily containing a diene-monomer-derived vinyl group in the molecular chain.

1) Ethylene

No particular limitation is imposed, and a hydrogen may be substituted by a halogen, etc.

2) Diene Monomer

As used herein, the diene monomer is a monomer having two or more C═C double bonds in the molecule. Mention may be given of C4–C20 conjugated diene compounds such as butadiene, isoprene, chloroprene, 1,3-hexadiene, 1,3-heptadiene, 1,3,5-hexatriene, 1,3,6-heptatriene; cyclodiene compounds such as cyclopentadiene, 2,5-norbornadiene, 1,3-cyclohexadiene, 1,4-cyclohexadiene, 1,3-cyclooctadiene, and 1,5-cyclooctadiene; and cycloolefins such as vinylnorbornene. Preferably, vinylstyrene compounds having styrene vinyl groups, such as those represented by the following formula (2) and (3), are used.

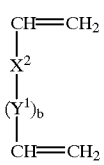

(2)

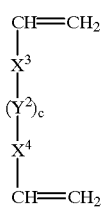
(3)

wherein each of $X^2$, $X^3$ and $X^4$ represents an aromatic compound residue such as benzene, naphthalene, or anthracene; an aromatic compound residue substituted by a C1–C20 alkyl group, such as toluene, xylene, or ethyl benzene; or a halogen-substituted aromatic compound residue such as chlorobenzene or bromobenzene; each of $Y^1$ and $Y^2$ represents $CH_2$, an alkylene group, or an alkyledene group; each of b and c represents an integer between 0 and 20 inclusive.

Specific examples of the compounds represented by formula (2) include o-divinylbenzene, m-divinylbenzene, p-divinylbenzene, (o-, m-, p-)divinyltoluene, (o-, m-, p-)2-propenylstyrene, (o-, m-, p-)3-butenylstyrene, and (o-, m-, p-) 4-pentenylstyrene.

Examples of the compounds represented by formula (3) include the compounds described below.

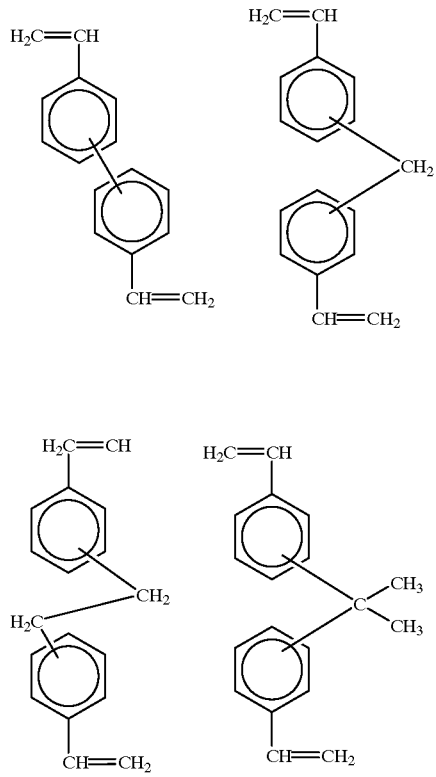

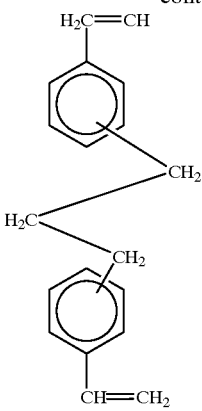

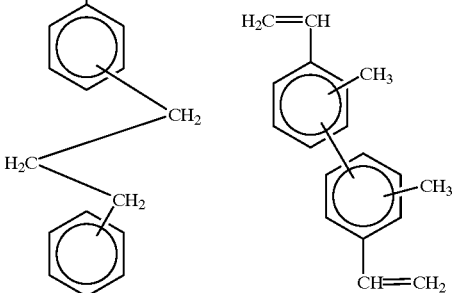

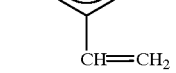

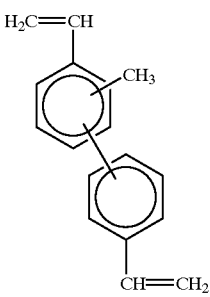

3) Aromatic Vinyl Monomer

Aromatic vinyl monomers which are usable in the present invention are selected from the compounds described above.

4) α-Olefins

Monomers which are usable in the present invention are α-olefin monomers other than ethylene. Specific examples include α-olefins such as propylene, butene-1, pentene-1, hexene-1, heptene-1, octene-1, nonene-1, decene-1,4-phenylbutene-1,6-phenylhexene-1,3-methylbutene-1,4-methylpentene-1,3-methylpentene-1,3-methylhexene-1,4-methylhexene-1,5-methylhexene-1,3,3-dimethylpentene-1, 3,4-dimethylpentene-1,4,4-dimethylpentene-1, and vinylcyclohexane; halogen-substituted α-olefins such as hexafluoropropene, tetrafluoroethylene, 2-fluoropropene, fluoroethylene, 1,1-difluoroethylene, 3-fluoropropene, trifluoroethylene, and 3,4-dichlorobutene-1; and cycloolefins such as cyclopentene, cyclohexene, norbornene, 5-methylnorbornene, 5-ethylnorbornene, 5-propylnorbornene, 5,6-dimethylnorbornene, 1-methylnorbornene, 7-methylnorbornene, 5,5,6-trimethylnorbornene, 5-phenylnorbornene; and 5-benzylnorbornene. One, two or more of the above-listed compounds may be used in the present invention.

5) The ethylene Copolymer Macromers (b) are Obtained through Copolymerization of the Above-Listed Monomers.

<5>-i> With regard to the ethylene copolymer macromers (b), recurrent units derived from ethylene are preferably contained in an amount of 99–1 mol %, more preferably 90–20 mol %, still more preferably 80–30 mol %. Recurrent units derived from diene monomer are preferably contained in an amount of 10–0.001 mol %, more preferably 5–0.01 mol %, still more preferably 1–0.05 mol %. In the case in which aromatic vinyl monomers or α-olefins are used as monomers, recurrent units derived from aromatic vinyl monomer are in amounts of 0–70 mol %, preferably 0–50 mol %, more preferably 0–30 mol % (exclusive of 0), and recurrent units derived from α-olefin are in amounts of 0–70 mol %, preferably 0–50 mol %, more preferably 0–20 mol % (exclusive of 0) In the case in which the amount of ethylene-derived recurrent units is in excess of 99 mol %, solubility of the macromers (b) in styrene monomers becomes low, and subsequently, it becomes difficult to carry out graft copolymerization. In the case in which the amount of ethylene-derived recurrent units is less than 1 mol %, macromers (b) may not function as rubbers. In the case in which the amount of recurrent units derived from diene is in excess of 10 mol %, cross-linking may occur along with graft copolymerization. In the case in which the amount of recurrent units derived from diene is less than 0.001 mol %, graft copolymerization may not proceed sufficiently. In the case in which the amount of aromatic-vinyl-monomer-derived recurrent units is in excess of 70 mol %, grass transition temperature may decrease to thereby deteriorate rubber elasticity. In the case in which the amount of α-olefin-derived recurrent units is in excess of 70 mol %, the macromers (b) tend to form crystals to result in poor solubility during graft copolymerization.

<5>-ii> The limiting viscosity [η] of the ethylene copolymer macromers (b) is 0.01–15 dl/g, preferably 0.1–12 dl/g, more preferably 0.5–10 dl/g, as measured in decalin at 135° C. In the case in which the limiting viscosity is less than 0.01 dl/g, poor compatibility results when graft copolymerization is carried out. In the case in which the limiting viscosity is in excess of 15 dl/g, the viscosity of the macromers (b), when they are in the form of solution, increases and, as a result, graft copolymerization may become difficult to carry out. The molecular weight distribution of the macromers (b) as measured by GPC (gel permeation chromatography) is 8 or less, preferably 6 ore less, more preferably 4 or less. If the molecular weight distribution is in excess of 8, graft copolymerization may not be carried out efficiently, and in addition, physicochemical properties of the resultant graft copolymers may become lowered.

<5>-iii> Methods for producing ethylene copolymer macromers (b)

Methods for producing the ethylene copolymer macromers (b) are not particularly limited. For example, in order to produce the macromers (b), it is preferable to carry out copolymerization by use of a catalyst system formed of a combination of vanadium halide or titanium halide such as vanadium tetrachloride, vanadium oxytrichloride or titanium tetrachloride, or vanadium compounds such as tri(acetylacetonate)vanadium, tri(2-methyl-1,3-butanedionato)vanadium, or tri(1,3-butanedionato)vanadium; and organic aluminum compounds such as trialkylaluminum or dialkylaluminum monohalide. Alternatively and preferably, the macromers (b) may be prepared through copolymerization by use of a catalyst formed of the following (a), (b), and (c). (a): a transition metal compound, (b): an oxygen-containing compound (i) and/or a compound capable of forming an ionic complex through reaction with transition metal compound (a) (ii), and (c): an optional alkylation agent.

<5>-iii-1> Respective Components of the Catalyst (a) Transition Metal Compounds:

various transition metal compounds may be used as the transition metal compound (a). Usually, it is preferable to use the compounds shown below.

(i) Compounds of formula (4):

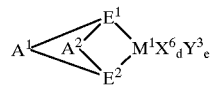

(4)

wherein $M^1$ represents a metal which belongs to Groups 3–10 of a periodic table or the lanthanoid group; each of $E^1$ and $E^2$ represents a ligand selected from among a substituted cyclopentadienyl group, an indenyl group, a substituted indenyl group, a fluorenyl group, a substituted fluorenyl group, a hexahydroazulenyl group, a substituted hexahydroazulenyl group, a tetrahydroindenyl group, a substituted tetrahydroindenyl group, a tetrahydrofluorenyl group, a substituted tetrahydrofluorenyl group, an octahydrofluorenyl group, a substituted octahydrofluorenyl group, a heterocyclopentadienyl group, a substituted heterocyclopentadienyl group, an amido group, a phosphide group, a hydrocarbon group, and a silicon-containing group, wherein $E^1$ and $E^2$ are identical to or different from each other and form a crosslinked structure together with $A^1$ and $A^2$; $X^5$ represents a ligand which may form a σ-bond, wherein when a plurality of $X^5$ are present, they may be identical to or different from one another and may be cross-linked with other $X^5$, $E^1$, $E^2$, or $Y^3$; $Y^3$ represents a Lewis base, wherein when a plurality of $Y^3$ are present, they may be identical to or different from one another and may be cross-linked with other $Y^3$, $E^1$, $E^2$, or $X^5$; $A^1$ and $A^2$ represent cross-linking groups formed of hydrocarbon groups having one or more carbon atoms which may be identical to or different from one another; d is an integer between 1 and 5 inclusive and represents "(valences of $M^1$)−2"; and e is an integer between 0 and 3 inclusive.

Specific examples of $X^5$ include a halogen atom, a C1–C20 hydrocarbon group, a C1–C20 alkoxy group, a C6–C20 aryloxy group, a C1–C20 amido group, a C1–C20 silicon-containing group, a C1-C20 phosphide group, a C1–C20 sulfide group, and a C1–C20 acyl group. Specific examples of $Y^3$ include amines, ethers, phosphines, and thioethers. Specific examples of $A^1$ and $A^2$ include a group of formula (5) below:

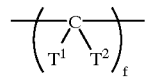

(5)

wherein each of $T^1$ and $T^2$, which may be identical to or different from each other, represents a hydrogen atom or a C1–C20 hydrocarbon group and may be linked to each other to form a ring; and f is an integer between 1 and 4 inclusive. Specific examples of the formula (5) group include a methylene group, an ethylene group, an ethylidene group, a propylidene group, an isopropylidene group, a cyclohexylidene group, a 1,2-cyrohexylene group, and a vinylidene group (CH=CO=). Of these groups, the methylene group, ethylene group, and isopropylidene group are preferred.

Specific examples of the transition metal compounds of formula (4) include (1,1'-ethylene)(2,2'-ethylene)-bis(indenyl)zirconium dichloride, (1,2'-ethylene)(2,1'-ethylene)-bis(indenyl)zirconium dichloride, (1,1'-methylene) (2,2'-methylene)-bis(indenyl)zirconium dichloride, (1,2'-methylene)(2,1'-methylene)-bis(indenyl) zirconium dichloride, (1,1'-isopropylidene)(2,2'-isopropylidene)-bis(indenyl) zirconium dichloride, (1,2'-isopropylidene)(2,1'-isopropylidene)-bis(indenyl)zirconium dichloride, (1,1'-ethylene) (2,2'-ethylene)-bis (3-methylindenyl) zirconium dichloride, (1,2'-ethylene)(2,1'-ethylene)-bis(3-methylindenyl)zirconium dichloride, (1,1'-ethylene)(2,2'-ethylene)-bis(4,5-benzoindenyl) zirconium dichloride, (1,2'-ethylene) (2,1'-ethylene)-bis (4,5-benzoindenyl)zirconium dichloride, (1,1'-ethylene)(2,2'-ethylene)-bis(4-isopropylindenyl) zirconium dichloride, (1,2'-ethylene) (2,1'-ethylene)-bis(4-isoprcpylindenyl) zirconium dichloride, (1,1'-ethylene)(2,2'-ethylene)-bis (5,6-dimethylindenyl) zirconium dichloride, (1,2'-ethylene) (2,1'-ethylene)-bis (5,6-dimethylindenyl)zirconium dichloride, (1,1'-ethylene) (2,2'-ethylene)-bis(4,7-diisopropylindenyl)zirconium dichloride, (1,2'-ethylene)(2,1'-ethylene)-bis(4,7-diisopropylindenyl)zirconium dichloride, (1,1'-ethylene) (2,2'-ethylene)-bis(4-phenylindenyl)zirconium dichloride, (1,2'-ethylene)(2,1'-ethylene)-bis(4-phenylindenyl)zirconium dichloride, (1,1'-ethylene)(2,2'-ethylene)-bis(3-methyl-4-isopropylindenyl) zirconium dichloride, (1,2'-ethylene)(2,1'-ethylene)-his(3-methyl-4-isopropylindenyl)zirconium dichloride, (1,1'-ethylene)(2,2'-ethylene)-bis(5,6-benzo indenyl)zirconium dichloride, (1,2'-ethylene)(2,1'-ethylene)-bis(5,6-benzoindenyl) zirconium dichloride, (1,1'-ethylene)(2,2'-isopropylidene)-bis(indenyl)zirconium dichloride, (1,2'-ethylene)(2,1'-isopropyliene)-bis(indenyl) zirconium dichloride, (1,1,'-isopropylidene)(2,2'-ethylene)-bis (indenyl)zirconium dichloride, (1,2'-methylene)(2,1'-ethylene)-his(indenyl)zirconium dichloride, (1,1'-methylenre)(2,2'-ethylene)-bis(indenyl)zirconium dichloride, (1,1'-ethylene)(2,2'-methylene)-bis(indenyl) zirconium dichloride, (1,1'-methylene)(2,2'-isopropylidene) - bis(indenyl)zirconium dichloride, (1,2'-methylene)(2,1'-isopropylidene)-bis(indenyl) dichloride, (1,1'-isopropylidene)(2,2'-methylene)-bis(indenyl)zirconium dichloride, (1,1'-methylene)(2,2'-methylene)(3-methylcyclopentadienyl)(cyclopentadienyl)zirconium dichloride, (1,1'-isopropylidene)(2,2'-isopropylidene)(3-methylcyclopentadienyl)(cyclopentadienyl)zirconium dichloride, (1,1'-propylidene)(2,2'-propylidene)(3-methylcyclopentadienyl)(cyclopentadienyl)zirconium dichloride, (1,1'-ethylene)(2,2'-methylene)-bis(3-methylcyclopentadienyl)zirconium dichloride, (1,1'-methylene)(2,2'-ethylene)-bis(3-methylcyclopentadienyl) zirconium dichloride, (1,1'-isopropylidene)(2,2'-ethylene)-bis(3-methylcyclopentadienyl)zirconium dichloride, (1,1'-ethylene)(2,2'-isopropylidene)-bis(3-methylcyclopentadienyl-1) zirconium dichloride, (1,1'-methylene)(2,2'-methylene)-bis (3-methylcyclopentadienyl) zirconium dichloride, (1,1'-methylene)(2,2'-isopropylidene)-bis(3-methylcyclopentadienyl)zirconium dichloride, (1,1'-isopropylidene)(2,2'-isopropylidene)-bis(3-methylcyclopentadienyl)zirconium dichloride, (1,1'-ethylene)(2,2'-methylene)-bis(3,4-dimethylcyclopentadienyl) zirconium dichloride, (1,1'-ethylene)(2,2'-isopropylidene)-bis(3,4-dimethylcyclopentadienyl)zirconium dichloride, (1,1'-methylene)(2,2'-methylene)-bis(3,4-dimethylcyclopentadienyl)zirconium dichloride, (1,1'-methylene)(2,2'-isopropylidene)-bis(3,4-dimethylcyclopentadienyl)zirconium dichloride, (1,1'-isopropylidene)(2,2'-isopropylidene)-bis(3,4-dimethylcyclopentadienyl)zirconium dichloride, (1,2'-ethylene)(2,1'-methylene)-bis(3-methylcyclopentadienyl) zirconium dichloride, (1,2'-ethylene)(2,1'-isopropylidene)-bis(3-methylcyclopentadienyl)zirconium dichloride, (1,2'-methylene)(2,1'-methylene)-bis(3-methylcyclopentadienyl) zirconium dichloride, (1,2'-methylene)(2,1'-isopropylidene)-bis(3-methylcyclopentadienyl)zirconium dichloride, (1,2'-isopropylidene)(2,1'-isopropylidene)-bis(3-methylcyclopentadienyl)zirconium dichloride, (1,2'-ethylene)(2,1'-methylene)-bis(3,4-dimethylcyclopentadienyl)zirconium dichloride, (1,2'-ethylene)(2,1'-isopropylidene)-bis(3,4-dinethylcyclopentadienyl)zirconium dichloride, (1,2'-methylene)(2,1'-methylene)-bis(3,4-dimethylcyclopentadienyl)zirconium dichloride, (1,2'-methylene)(2,1'-isopropylidene)-bis(3,4-dimethylcyclopentadienyl)zirconium dichloride, and (1,2'-isopropylidene)(2,1'-isopropylidene)-bis(3,4-dimethylcyclopentadienyl)zirconium dichloride. Compounds corresponding to these compounds in which zirconium has been replaced by titanium or hafnium may also be used. However, the transition metal compounds which are useful in the present invention are not limited only to the above-listed compounds. Also, analogs of the metal elements belonging to other groups or lanthanoid group may be used.

(ii) Compounds represented by the following formula (6) or (7):

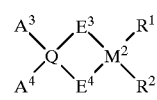

(6)

(7)

wherein each of $E^3$, $E^4$, $E_5$, and $E^6$, which may be identical to or different from each other, represents a substituted or unsubstituted cyclopentadienyl group, an indenyl group, a substituted indenyl group, a fluorenyl group, a substituted fluorenyl group, a hexahydroazulenyl group, a substituted hexahydroazulenyl group, a tetrahydroindenyl group, a substituted tetrahydroindenyl group, a tetrahydrofluorenyl group, a substituted tetrahydrofluorenyl group, an octahydrofluorenyl group, or a substituted octahydrofluorenyl group; each of $A^3$ and $A^4$, which may be identical to or different from each other, represents a hydrogen atom, a C1–C10 alkyl group, a C6–C20 aryl group, a C6–C20 alkylaryl group, a C6–C20 arylalkyl group, a haloaryl group, or a C1–C20 hydrocarbon group containing a hetero atom which is selected from among oxygen, nitrogen, sulfur, and silicon; Q, which connects $E^3$ and $E^4$, represents a C2–C10 hydrocarbon group, a C1–C10 hydrocarbon group containing silicon, germanium, or tin, a carbon atom, a silicon atom, a germanium atom, or a tin atom; $A^3$ and $A^4$ may be linked to each other to form a ring together with Q; each of $R^1$, $R^2$, $R^3$ and $R^4$, which may be identical to or different from each other, represents a halogen atom, a hydrogen atom, a C1–C10 alkyl group, a silicon-containing alkyl group, a C6–C20 aryl group, a C6–C20 alkylaryl group, or a C6–C20 arylalkyl group; each of $M^2$ and $M^3$ represents titanium, zirconium, or hafnium.

Specific examples of $E^3$, $E^4$, $E^3$ and $E^6$ mentioned above include a cyclopentadienyl group, a methylcyclopentadienyl group, a dimethylcyclopentadienyl group, a tetramethylcyclopentadienyl group, an indenyl group, a 3-methylindenyl group, a tetrahydroindenyl group, a fluorenyl group, a methylfluorenyl group, a hexahydroazulenyl group, an octahydrofluorenyl group, and a 2,7-di-t-butylfluorenyl group.

Specific examples of $A^3$ and $A^4$ include a hydrogen atom, a methyl group, an ethyl group, a propyl group, a phenyl group, a toluyl group, a fluorophenyl group, a methoxyphenyl group, and a benzyl group.

In the case in which $A^3$ and $A^4$ are linked to each other and form a ring structure together with Q, specific examples of groups which may be formed by $A^3$, $A^4$, and Q include a cyclopentylidene group, a cyclohexylidene group, and a tetrahydropyran-4-ylidene.

Preferable examples of $R^1$, $R^2$, $R^3$ and $R^4$ include a chlorine atom, a methyl group, a phenyl group, and a trimethylsilylmethyl group.

Specific examples of the above-mentioned transition metal compounds include ethylenebis(1-indenyl)zirconium dichloride, ethylenebis(tetrahydro-1-indenyl)zirconium dichloride, isopropylidene(cyclopentadienyl)-(fluorenyl) zirconium dichloride, methylphenylmethylene-(cyclopentadienyl)(fluorenyl)zirconium dichloride, diphenylmethylene(cyclopentadienyl)(fluorenyl)zirconium dichloride, isopropylidene(9-fluorenyl)(1-indenyl) zirconium dichloride, dimethylsilyl-bis-(2-methylindenyl) zirconium dichloride, dimethylsilyl-bis-(2-methylbenzoindenyl)-zirconium dichloride, dimethylsilyl-bis-(2-methyl-4-phenylindenyl)zirconium dichloride, and dimethylsilyl-bis-(2-methyl-4-naphthylindenyl)zirconium dichloride.

(iii) Compounds represented by the following formula (8):

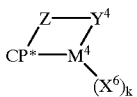

(8)

wherein $M^4$ represents titanium, zirconium, or hafnium; Cp* represents a cyclopentadienyl group, a substituted cyclopentadienyl group, an indenyl group, a substituted indenyl group; a fluorenyl group; a substituted fluorenyl group; a hexahydroazulenyl group, a substituted hexahydroazulenyl group, a tetrahydroindenyl group, a substituted tetrahydroindenyl group, a tetrahydrofluorenyl group, a substituted tetrahydrofluorenyl group, an octahydrofluorenyl group or a substituted octahydrofluorenyl group, each of which is bonded to $M^4$ via a $\eta^5$ bonding mode; $X^6$ represents a $\sigma$ ligand; g represents 1 or 2; a plurality of $X^6$ may be identical to or different from one another and may be linked together via an arbitrary group; $Y^4$ represents O, S, NR, $CR_2$, or a neutral two-electron donor selected from OR, SP, $NR_2$, or $PR_2$; $Z_1$ represents $SiR_2$, $CR_2$, $SiR_2SiR_2$, $CR_2CR_2$, CR=CR, $CRSiR_2$, $GeR_2$, BR, or $BR_2$; R represents hydrogen, an alkyl group, an aryl group, a silyl group, a haloalkyl group, a haloaryl group, or a combination of at least two of the above groups selected so as to have 20 or fewer non-hydrogen atoms; and two or more of the above R may further form a condensed ring system with $Z^1$ or with $Y^4$ and $Z^1$.

In the present description, examples of the substituted cyclopentadienyl group include cyclopentadienyl groups substituted with one or more C1-C6 alkyl groups such as a methylcyclopentadienyl group, a 1,2-dimethylcyclopentadienyl group, a 1,2,4-trimethylcyclopentadienyl group, a 1,2,3,4-tetramethylcyclopentadienyl group, a trimethylsilylcyclopentadienyl group, a 1,3-di(trimethylsilyl)cyclopentadienyl group, a tertiary butylcyclopentadienyl group, a 1,3-di(tertiary butyl) cyclopentadienyl group, a C1–C20 hydrocarbyl group, or a halohydrocarbyl group. Examples of the substituted indenyl group include a methylindenyl group, a dimethylindenyl group, a tetramethylindenyl group, and a hexamethylindenyl group. Examples of the substituted tetrahydroindenyl group include a 4,5,6,7-tetrahydroindenyl group, a 1-methyl-4,5,6,7-tetrahydroindenyl group, a 2-methyl-4,5,6,7-tetrahydroindenyl group, a 1,2-dimethyl-4,5,6,7-tetrahydroindenyl group, a 1,3-dimethyl-4,5,6,7-tetrahydroindenyl group, a 1,2,3-trimethyl-4,5,6,7-tetrahydroindenyl group, a 1,2,3,4,5,6,7-heptamethyl-4,5,6,7-tetrahydroindenyl group, a 1,2,4,5,6,7-hexamethyl-4,5,6,7-tetrahydroindenyl group, a 1,3,4,5,6,7-hexamethyl-4,5,6,7-tetrahydroindenyl group, and a 4,5,6,7-tetrahydro-1,2,3-trimethylindenyl group. Examples of the substituted fluorenyl group include a methylfluorenyl group, a dimethylfluorenyl group, a tetramethylflourenyl group, and an octamethylfluorenyl group Examples of the substituted tetrahydrofluorenyl group include a 1,2,3,4-tetrahydrofluorenyl group and a 9-methyl-1,2,3,4-tetrahydrofluorenyl group, and examples of the substituted octahydrofluorenyl group include a 9-methyl-octahydrofluorenyl group. Examples of the substituted hexahydroazulenyl group include a 1-methylhexahydroazulenyl group, a 2-methylhexahydroazulenyl group, a 1,2-dimethylhexahydroazulenyl group, a 1,3-dimethylhexahydroazulenyl group, and a 1,2,3-trimethylhexahydroazulenyl group.

$X^6$ represents a $\sigma$ ligand, and examples include hydrido, halogen, alkyl, silyl, aryl, arylsilyl, amido, aryloxy, alkoxy, silyloxy, phosphido, sulfido, acyl, cyanido, azido, acetylacetonato, and a combination thereof.

Specific examples of compounds having the above ligands include (t-butylamido) (tetramethylcyclopentadienyl)-1,2-ethanediylzirconium dichloride, (t-butylamido)-(tetramethylcyclopentadienyl)-1, 2ethanediyltitanium dichloride, (methylamido) (tetramethylcyclopentadienyl)-1,2-ethanediylzirconium dichloride, (methylamido)-(tetramethylcyclopentadienyl)-1,2-ethanediyltitanium dichloride, (ethylamido) (tetramethylcyclopentadienyl)methylenetitanium dichloride, (t-butylamido)dimethyl-(tetramethylcyclopentadienyl) silanetitanium dichioride, (t-butylomido) dimethyl(tetramethylcyclopentadienyl) silanezirconium dichloride, (t-butylamido)dimethyl (tetramethyl-cyclopentadienyl)silanetitanim dimethyl, (t-butylamido) dimethyl(tetramethylcyclopentadienyl) silanezirconium dimethyl, (t-butylamido)dimethyl-(tetramethylcyclopentadienyl)-silanetitanium dibenzyl, (t-butylamido)dimethyl-(tetramethylcyclopentadienyl)-silanezirconium dibenzyl, (benzylamido)dimethyl-(tetramethylcyclopentadienyl)silanetitanium dichloride, (phenylphosphido)dimethyl-(tetra-methylcyclopentadienyl)-silanezirconium dibenzyl, (t-butylamido)dimethyl-(tetramethylcyclopentadienyl) silanetitanium chloride, (dimethylaminoethyl) tetramethylcyclopentadienyl-titanium(III) dichloride, 9-(dimethylaminoethyl)octahydro-fluorenyltitanium(III) dichloride, (di-n-butylaminoethyl) tetramethyl-cyclopentadienyltitanium(III) dichloride, (dimethylaminomethyl)tetramethyl-cyclopentadienyltitanium(III) dichloride, and (dimethylaminopropyl)tetramethyl- cyclopentadienyl-titanium(III) dichloride.

(iv) Transition metal compounds having a single $\pi$ ligand $R^5$ represented by the following formula (9):

$$M^5R^5X^7{}_h \qquad (9)$$

wherein $M^5$ represents a transition metal of Group 4 in the periodic table or a lanthanide metal; $R^5$ represents a π ligand, e.g., a group having a cyclopentadienyl skeleton; $X^7$ represents a hydrogen atom, a halogen atom, a C1–C20 hydrocarbyl group, a C1–C20 alkoxy group, a C1–C20 thioalkoxy group, a C6–C20 aryl group, a C6–C20 aryloxy group, a C6–C20 thioaryloxy group, an amino group, or an alkylsilyl group; a plurality of $X^7$ may be identical to or different from one another and may be linked to $R^5$ via a specific group; and h represents "(valences of M)–1".

Examples of the compounds represented by formula (9) include mono(cyclopentadienyl)transition metal compounds, mono(indenyl)transition metal compounds, and mono(fluorenyl)transition metal compounds. Examples of the substituted cyclopentadienyl group include cyclopentadienyl groups substituted with one or more C1–C6 alkyl groups such as a ethylcyclopentadienyl group, a 1,3-dimethylcyclopentadienyl group, a 1,2,4-trimethylcyclopentadienyl group, a 1,2,3,4-tetramethylcyclopentadienyl group, a trimethylsilylcyclopentadienyl group, a 1,3-di(trimethylsilyl)cyclopentadienyl group, a tertiary butylcyclopentadienyl group, a 1,3-di(tertiary butyl)cyclopentadienyl group, and a pentamethylcyclopentadienyl group. Examples of the indenyl or fluorenyl ligands include an indenyl group, a substituted indenyl group, a fluorenyl group, a substituted fluorenyl group, a hexahydroazulenyl group, a substituted hexahydroazulenyl group, a tetrahydroindenyl group, a substituted tetrahydroindenyl group, a tetrahydrofluorenyl group, a substituted tetrahydrofluorenyl group, a octahydrofluorenyl group, and a substituted octahydrofluorenyl group. Titanium is preferably used as a transition metal. Examples of the titanium compounds include cyclopentadienyltrimethyltitanium, cyclopentadienyltriethyltitanium, cyclopentadienyltripropyltitanium, cyclopentadienyltributyltitanium, methylcyclopentadienyltrimethyltitanium, 1,2-dimethylcyclopentadienyltrimethyltitanium, 1,2,4-trimethylcyclopentadienyltrimethyltitanium, 1,2,3,4-tetrxethylcyclopentadienyltrimethyltitanium, pentamethylcyclopentadienyltrimethyltitanium, pentamethylcyclopentadienyltriethyltitanium, pentamethylcyclopentadienyltripropyltitanium, pentamethylcyclopentadienyltributyltitanium, cyclopentadienylmethyltitanium dichloride, cyclopentadienylethyltitanium dichloride, pentamethylcyclopentadienylmethyltitanium dichloride, pentamethylcyclopentadienylethyltitanium dichloride, cyclopentadienyldimethyltitanium monochloride, cyclopentadienyldiethyltitanium monochloride, cyclopentadienyltitanium trimethoxide, cyclopentadienyltitanium triethoxide, cyclopentadienyltitanium tripropoxide, cyclopentadienyltitanium triphenoxide, pentamethylcyclopentadienyltitanium trimethoxide, pentamethylcyclopentadienyltitanium triethoxide, pentamethylcyclopentadienyltitanium tripropoxide, pentamethylcyclopentadienyltitanium triphenoxide, cyclopentadienyltitanium trichloride, pentamethylcyclopentadienyltitanium trichloride, cyclopentadienylmethoxytitanium dichloride, cyclopentadienyldimethoxytitanium chloride, pentamethylcyclopentadienylmethoxytitanium dichloride, cyclopentadienyltribenzyltitanium, pentamethylcyclopentadienylmethyldiethoxytitanium, indenyltitanium trichloride, indenyltitanium trimethoxide, indenyltitanium triethoxide, indenyltrimethyltitanium, indenyltribenzyltitanium, pentamethylcyclopentadienyltitanium trithiomethoxide, pentamethylcyclopentadienyltitanium trithiophenoxide, (1,2,3,4,5,6,7,8-octahydrofluorenyl)titanium trichloride, and (1,2,3,4,5,6,7,8-octahydrofluorenyl)titanium trimethoxide.

(v) Compounds represented by formula (10):

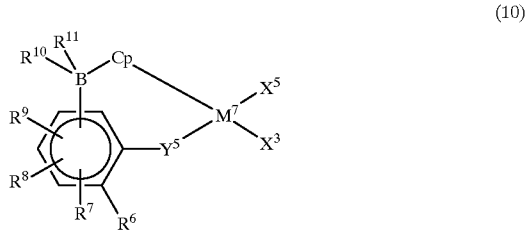

(10)

wherein $M^7$ represents a transition metal of Group 4 in the periodic table; Cp represents a cyclopentadienyl skeleton; $Y^5$ represents O, S, NR, PR, CP, or a neutral two-electron donor selected from OR, SR, $NR_2$, and $PR_2$; B represents an atom of Group 14 in the periodic table; R represents hydrogen, an alkyl group, an aryl group, a silyl group, a haloalkyl group, a haloaryl group, or a combination of at least two of the above groups selected so as to have 20 or fewer non-hydrogen atoms; each of $X^8$ and $X^9$, which may be identical to or different from each other, represents a hydrogen atom, a halogen atom, a C1–C20 hydrocarbyl group, a C1–C20 halohydrocarbyl group, a C1–C20 alkoxy group, a C6–C20 aryloxy group, or a C2–c20 di-substituted amino group; and each of $R^6$ through $R^{11}$, which may be identical to or different from one another and may be arbitrarily linked to form a ring, represents a hydrogen atom, a halogen atom, a C1–C20 hydrocarbyl group, a C1 –C20 halohydrocarbyl group, a C1–C20 alkoxy group, a C6–C20 aryloxy group, a C2–C20 di-substituted amino group, or a C1-C20 silyl group.

The groups having a cyclopentadienyl skeleton in the above Cp represent a group such as a cyclopentadienyl group, a substituted cyclopentadienyl group, an indenyl group, a substituted indenyl group, a fluorenyl group, a substituted fluorenyl group, a hexahydroazulenyl group, a substituted hexahydroazulenyl group, a tetrahydroindenyl group, a substituted tetrahydroindenyl group, a tetrahydrofluorenyl group, a substituted tetrahydrofluorenyl group, a octahydrofluorenyl group, or a substituted octahydrofluorenyl group Examples of B include a carbon atom, a silicon atom, and a germanium atom, with a carbon atom and a silicon atom being preferred.

Specific examples of the compounds represented by formula (10) include isopropylidene(cyclopentadienyl)(3-t-butyl-5-methyl-2-phenoxy)titanium dichloride, isopropylidene(methylcyclo pentadienyl)(3-t-butyl-5-methyl-2-phenoxy)titanium dichloride, isopropylidene (dimethylcyclopentadienyl)(3-t-butyl-5-methyl-2-phenoxy) titanium dichloride, isopropylidene (trimethylcyclopentadienyl)(3-t-butyl-5-methyl-2-phenoxy) titanium dichloride, isopropylidene (tetramethylcyclopentadienyl)(3-t-butyl-5-methyl-2-phenoxy)titanium dichloride, isopropylidene(n-propylcyclopentadienyl)(3-t-butyl-5-methyl-2-phenoxy) titanium dichloride, isopropylidene(primary butylcyclopentadienyl)(3-t-butyl-5-methyl-2-phenoxy) titanium dichloride, isopropylidene (phenylcyclopentadienyl)(3-t-butyl-5-methyl-2-phenoxy) titanium dichloride, isopropylidene (cyclopentadienyl)(3-t-butyl-2-phenoxy)titanium dichloride, isopropylidene (methylcyclopentadienyl)(3-t-butyl-2-phenoxy)titanium dichloride, isopropylidene(dimethylcyclopentadienyl)(3-t-butyl-2-phenoxy)titanium dichloride, isopropylidene (trimethylcyclopentadienyl)(3-t-butyl-2-phenoxy)titanium dichloride, isopropylidene(tetramethylcyclopentadienyl)(3-t-butyl-2-phenoxy)titanium dichloride, isopropylidene(n-propylcyclopentadienyl) (3-t-butyl-2-phenoxy) titanium dichloride, isopropylidene (primary butylcyclopentadienyl) (3-t-butyl-2-phenoxy)titanium dichloride, isopropylidene (phenylcyclopentadienyl) (3-t-butyl-2-phenoxy) titanium dichloride, isopropylidene(cyclopentadienyl)(2-phenoxy) titanium dichloride, isopropylidene (methylcyclopentadienyl) (2-phenoxy)titanium dichloride, isopropylidene (dimethylcyclopentadienyl)(2-phenoxy) titanium dichloride, isopropylidene (trimethylcyclopentadienyl)(2-phenoxy)titanium dichloride, isopropylidene(tetramethylcyclopentadienyl)(2-phenoxy) titanium dichloride, isopropylidene(n-propylcyclopentadienyl)(2-phenoxy)titanium dichloride, isopropylidene(primary butylcyclopentadienyl)(2-phenoxy) titanium dichloride, and isopropylidene (phenylcyclopentadienyl)(2-phenoxy)titanium dichloride. Examples also include the above compounds in which titanium is substituted with zirconium or hafnium and in which isopropylidene is substituted with dimethylsilylene, diphenylsilylene, or methylene. Examples further include the above compounds in which dichloride is substituted with dibromide, diiodide, dimethyl, dibenzyl, dimethoxide, or diethoxide.

The ethylene copolymers of the present invention are preferably produced by use of a compound represented by formula (6) or formula (8), in that they provide excellent copolymerization ability among the above-described transition metal compounds. More preferably, a compound represented by formula (8) is used.

(b) Oxygen-containing compounds (i) and/or compounds capable of forming an ionic complex through reaction with a transition metal compound (ii):

The component (b) which serves as the polymerization catalyst in the present invention contains the below-described oxygen-containing compounds (ii) and/or compounds capable of forming an ionic complex through reaction with a transition metal compound (ii).

Oxygen-Containing Compounds (Component (i))

The oxygen-containing compounds comprise a compound represented by the below-described formula (11):

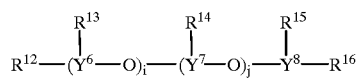

(11)

and/or a compound represented by the below-described formula (12):

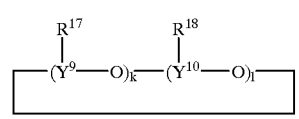

(12)

wherein, each of $R^{12}$ through $R^{18}$ represents a C1–C8 alkyl group, specifically, a methyl group, an ethyl group, an n-propyl group, an isopropyl group, a butyl group, a pentyl group, a hexyl group, a heptyl group, or an octyl group. through $R^{16}$, or $R^{17}$ and $R^{18}$ may be identical to or different from each other. Each of $Y^6$ through $Y^{10}$ represents a Group 13 element, specifically, B, Al, Ga, In, and Tl, with B and Al being preferred. $Y^6$ through $Y^8$, or $Y^9$ and $Y^{10}$ may be identical to or different from each other. Each of i through l is a number between 0 and 50 inclusive, and each of (i+j) and (k+1) is a number of 1 or more. The preferable range for each of i through l is 1–20 inclusive, with 1–5 inclusive being particularly preferred.

Preferable examples of the oxygen-containing compounds used as the above-mentioned catalyst component, particularly examples of alkylaluminoxanes, include compounds having a proportion of the high-magnetic field component in a methyl proton signal region of 50% or less based on an aluminum-methyl (Al—$CH_3$) bond measured through a $^1$H-NMR spectrum. Briefly, when the above oxygen-containing compound is subjected to measurement of its $^1$H-NMR spectrum in a solvent toluene at room temperature, a methyl proton signal based on Al—$CH_3$ is observed in the range between 1.0 and −0.5 with tetramethylsilane (TMS) as a standard. Since the proton signal of TMS (0 ppm) exists in the region for observing a methyl proton based on Al—$CH_3$, a methyl proton signal is measured with a methyl proton signal ranging from toluene of 2.35 ppm to the TMS standard as a standard. The signal is formed of a high-magnetic field component (i.e., from 0.1 to −0.5 ppm) and the other component (i.e., from 1.0 to −0.1 ppm). The compounds which may preferably be used have a high-magnetic field component of 50% or less, preferably 5–45%.

Compounds Capable of Forming an Ionic Complex Through Reaction with a Transition Metal Compound (Component (II))

Examples of the compound capable of forming an ionic complex through reaction with a transition metal compound include coordination compounds and Lewis acids comprising a cation and an anion containing a metal to which a plurality of groups are bonded. There exist a variety of coordination compounds which comprise a cation and an anion containing a metal to which a plurality of groups are bonded, and compounds represented by the below-described formulas (13) and (14) may preferably be used:

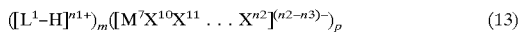 (13)

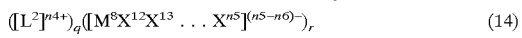 (14)

wherein $L^1$ represents a Lewis base; each of $M^7$ and $M^8$ represents a metal selected from Group 5 to Group 15 elements; $L^2$ represents a $M^9$, $R^{19}R^{20}$ $M^{10}$, or $R^{21}{}_3C$, wherein $M^9$ represents a metal of Group 1 or a metal selected from Group 8 to Group 12 elements, $M^{10}$ represents a metal selected from Group 8 to Group 10 elements, each of $R^{19}$ and $R^{20}$ represents a cyclopentadienyl group, a substituted cyclopentadienyl group, an indenyl group, or a fluorenyl group; $R^{21}$ represents an alkyl group; each of $X^{10}$, $X^{11}$ through $X^{n2}$ and $X^{12}$, $X^{13}$ through $X^{n5}$ represents a hydrogen atom, a dialkylamino group, an alkoxy group, an aryloxy group, a C1–C20 alkyl group, a C6–C20 aryl group, an alkylaryl group, an arylalkyl group, a substituted alkyl group, an organic metalloid group, or a halogen atom; n3 represents a valence of $M^7$ and n6 represents a valence of $M_6$, and each of n3 and n6 is an integer between 1–7 inclusive; n1 represents an ion valence of $L^1$-H, n4 represents an ion valence of $L^2$, and each of n1 and n4 is an integer between 1–7 inclusive; each of n2 and n5 is an integer between 2 and 8 inclusive; each of m and q is an integer of one or more; p=m×n1/(n2−n3); and r=q×n4/(n5−n6).

Examples of $M^7$ and $M^8$ include atoms such as B, Al, Si, P, As, or Sb; examples of $M^9$ include atoms such as Ag, Cu, Na, or Li; and examples of $M^{10}$ include atoms such as Fe, Co, or Ni. Examples of $X^{10}$ through $X^{n2}$ and $X^{12}$ through $X^{n5}$ include dialkylamino groups such as a dimethylamino group or a diethylamino group; alkoxy groups such as a methoxy group, an ethoxy group, or an n-butoxy group; aryloxy groups such as a phenoxy group, a 2,6-dimethylphenoxy group, or a naphthyloxy group; C1–C20 alkyl groups such as a methyl group, an ethyl group, an n-propyl group, an isopropyl group, an n-butyl group, an n-octyl group, or a 2-ethylhexyl group; C6–C20 aryl groups, alkylaryl groups, or arylalkyl groups such as a phenyl group, a p-tolyl group, a benzyl group, a pentafluorophenyl group, a 3,5-di(trifluoromethyl)phenyl group, a 4-tertiary butylphenyl group, a 2,6-dimethylphenyl group, a 3,5-dimethylphenyl group, a 2,4-dimethylphenyl group, or a 1,2-dimethylphenyl group; halogens such as F. Cl, Br, or I; organic metalloid groups such as a pentamethylantimonyl; a trimethylsilyl, a trimethylgermyl group, a diphenylarsenyl, a dicyclohexylantimonyl, or a diphenylboron group. Examples of the (substituted) cyclopentadienyl group represented by $R^{19}$ and $R^{20}$ respectively, include a methylcyclopentadienyl group, a butylcyclopentadienyl group, and a pentamethylcyclopentadienyl group.

Specific examples of the anion containing a metal to which a plurality of groups are bonded include $B(C_6F_5)_4^-$, $B(C_6HF_4)_4^-$, $B(C_6H_2F_3)_4^-$, $B(C_6H_3F_2)_4^-$, $B(C_6H_4F)_4^-$, $B(C_6CF_3F_4)_4^-$, $B(C_6H_5)_4^-$, $PF_6^-$, $P(C_6F_5)_6^-$, and $Al(C_6HF_4)_4^-$. Examples of the metal-containing cation include $Cp_2Fe^+$, $(MeCp)_2Fe^+$, $(t\text{-}BuCp)_2Fe^+$, $(Me_2Cp)_2Fe^+$, $(Me_3Cp)_2Fe^+$, $(Me_4Cp)_2Fe^+$, $(Me_5Cp)_2Fe^+$, $Ag^+$, $Na^+$, and $Li^+$ and examples of the other cations include nitrogen-containing compounds such as pyridinium, 2,4-dinitro-N,N-diethylanilinium, diphenylammonium, p-nitroanilinium, 2,5-dichloroanilinium, p-nitro-N,N-dimethylanilinium, quinolinium, N,N-dimethylanilinium, or N,N-diethylanilinium; carbenium compounds such as triphenylcarbenium, tri(4-methylphenyl)carbenium, or tri(4-methoxyphenyl)carbenium; alkylphosphonium ions such as $CH_3PH_3^+$, $C_2H_5PH_3^+$, $C_3H_7PH_3^+$, $(CH_3)_2PH_2^+$, $(C_2H_5)_2PH_2^+$, $(C_3H_7)_2PH_2^+$, $(CH_3)_3PH^+$, $(C_2H_5)_3PH^+$, $(C_3H_7)_3PH^+$, $(CF_3)_3PH^+$, $(CH_3)_4P^+$, $(C_2H_5)_4P^+$, or $(C_3H_7)_4P^+$; and arylphosphonium ions such as $C_6H_5PH_3^+$, $(C_6H5)_2PH_2^+$, $(C_6H_5)_3PH^+$, $(C_6H_5)_4P^+$, $(C_2H_5)_2(C_6H_5)PH^+$, $(CH_3)(C_6H_5)PH_2^+$, $(CH_3)_2(C_6H_5)PH^+$, or $(C_2H_5)_2(C_2H_5)_2P^+$.

Specifically, among the compounds represented by formulas (13) and (14), the following compounds are preferably used. Examples of the compound represented by formula (13) include triethylammonium tetraphenylborate, tri(n-butyl)ammonium tetraphenylborate, trimethylammnonium tetraphenylborate, triethylammonium tetrakis(pentafluorophenyl)borate, tri(n-butyl)ammonium tetrakis(pentafluorophenyl)borate, triethylammonium hexafluoroarsenate, pyridinium tetrakis (pentafluorophenyl) borate, pyrrolinium tetrakis (pentafluorophenyl)borate, N,N-dimethylanilinium tetrakis (pentafluorophenyl)borate, and methyldiphenylammonium tetrakis(pentafluorophenyl) borate. Examples of the compound represented by formula (14) include ferrocenium tetraphenylborate, dimethylferrocenium tetrakis (pentafluorophenyl)borate, ferrocenium tetrakis (pentafluorophenyl) borate, decamethylferrocenium tetrakis (pentafluorophenyl) borate, acetylferrocenium tetrakis (pentafluorophenyl)borate, formylferrocenium tetrakis (pentafluorophenyl) borate, cyanoferrocenium tetrakis (pentafluorophenyl)borate, silver tetrakis (pentafluorophenyl)borate, trityl tetrakis (pentafluorophenyl)borate, silver hexafluoroarsenate, silver hexafluoroantimonate, and silver tetrafluoroborate.

Examples of the Lewis acids which may be used include $B(C_6F_5)_3$, $B(C_6HF_4)_3$, $B(C_6H_2F_3)_3$, $B(C_6H_3F_2)_3$, $B(C_6H_4F)_3$, $B(C_6CF_3F_4)_3$, $PF_5$, $P(C_6F_5)_5$, and $Al(C_6HF_4)_3$. In the polymerization catalysts used in the present invention as the component (B), oxygen-containing compounds may exclusively be used singly or in combination of two or more species serving as the component (i) or compounds being able to form an ionic complex through reaction with a transition metal compound may exclusively be used singly or in combination of two or more species serving as the component (ii). Alternatively, the component (i) and the component (ii) may appropriately used in combination.

(c) Alkylating Agents:

There are a variety of alkylating agents, and examples thereof include alkyl group-containing aluminum compounds represented by formula (15):

$$R^{22}{}_z Al(OR^{23})_t X^{14}{}_{(3-s-t)} \qquad (15)$$

wherein each of $R^{22}$ and $R^{23}$ represents a C1–C8, preferably a C1–C4, alkyl group; $X^{14}$ represents a hydrogen atom or a halogen atom; s is defined as $0<s\leq 3$, and is preferably 2 or 3, most preferably 3; t is defined as $0\leq t<3$, and is preferably 0 or 1; alkyl group-containing magnesium compounds represented by formula (16):

$$R^{24}{}_2 Mg \qquad (16)$$

wherein $R^{24}$ represents a C1–C8, preferably a C1–C4, alkyl group; and alkyl group-containing zinc compounds represented by formula (17):

$$R^{25}{}_z Zn \qquad (17)$$

wherein $R^{25}$ represents a C1–C8, preferably a C1–C4, alkyl group.

Among these alkyl group-containing compounds, alkyl group-containing aluminum compounds, inter alia, trialkylaluminum compounds and dialkylaluminum compounds, are preferred.

<5>-iii-2> Methods for Preparing the Catalysts

Examples of methods for contacting components (a) and (b) of the catalysts for polymerization with an optional component (c) include (1) adding the component (c) to a mixture of the component (a) and the component (b) to thereby provide a catalyst, and contacting monomers to be polymerized with the catalyst; (2) adding the component (a) to a mixture of the component (b) and the component (c) to thereby provide a catalyst, and contacting monomers to be polymerized with the catalyst; (3) adding the component (b) to a mixture of the component (a) and the component (c) to thereby provide a catalyst, and contacting monomers to be polymerized with the catalyst; (4) individually contacting the components (a), (b), and (c) with monomer components to be polymerized; and (5) contacting a mixture of a monomer component to be polymerized and the component (c) with the catalysts prepared in the above (1) through (3).

The above component (a) and component (b) are contacted with the optional component (c) at the polymerization temperature or in the temperature range from −20 to 200° C.

Organic aluminum compounds such as triisobutylaluminum may be added prior to feeding catalyst components.

<S>-iii-3> Polymerization Methods

Bulk polymerization may be employed as the polymerization method, and polymerization may be conducted in aliphatic hydrocarbon solvents such as pentane, hexane, or heptane; alicyclic hydrocarbon solvents such as cyclohexane; and aromatic hydrocarbon solvents such as benzene, toluene, xylene, or ethylbenzene. No particular limitation is imposed on the polymerization temperature, and it is typically 0–200° C., preferably 20–100° C.

In the obtained ethylene copolymers, the compositional ratio of structural repeating units derived from monomers may be appropriately regulated through feed amounts of the monomers.

(I-3) Graft copolymerization products of aromatic vinyl monomers (a). and the above-described ethylene copolymer macromers (b)

The graft copolymerization products are obtained by copolymerizing aromatic vinyl monomers (a) and the above-described ethylene copolymer macromers (b) Preferably, chains derived from aromatic vinyl monomers in the products have stereospecificity of highly syndiotactic structure.

1) Method for Preparing Graft Copolymerization Products

No particular limitation is imposed on the method for preparing the graft copolymerization products. For example, the graft copolymerization products may be obtained by adding a powdered ethylene copolymer macromer to a pre-synthesized syndiotactic aromatic vinyl polymer and heating to initiate reaction. Preferably, the graft copolymerization products may be obtained by dissolving the ethylene copolymer macromer in an aromatic vinyl monomer or a solvent containing the same, then copolymerizing by use of (a) a transition metal compound, (b) (i) an oxygen-containing compound and/or (ii) a compound that can form an ionic complex through reaction with a transition metal compound, and (c) an optional alkylating agent. In this case, there is preferably used a method in which the ethylene copolymer macromer is dissolved in an aromatic vinyl monomer or a solvent containing the same, in view of conducting homogeneous reaction. No particular limitation is imposed on the solvent, and hydrocarbon solvents such as toluene, benzene, or ethylbenzene are preferably used. Next will be described catalysts preferably used for copolymerization.

<1>-i> Components of Catalyst:

(a) Transition Metal Compounds

A variety of transition metals may be used as transition metal compound (a), and there may be used the aforementioned transition metal compounds serving as the component of the polymerization catalyst for the above-described ethylene copolymer macromer. Moreover, compounds represented by formula (18) or formula (19) may be used.

$$M^{11}R^{26}{}_{u}R^{27}{}_{v}R^{28}{}_{w}R^{29}{}_{4-(u+v+w)} \tag{18}$$

$$M^{12}R^{30}{}_{x}R^{31}{}_{y}R^{22}{}_{5-(x+y)} \tag{19}$$

wherein each of $M^{11}$ and $M^{12}$ represents a metal that belongs to Groups 3–6 or the lanthanum group; each of $R^{26}$ through $R^{32}$ represents an alkyl group, an alkoxy group, an aryl group, an alkylaryl group, an arylalkyl group, an aryloxy group, an acyloxy group, a cyclopentadienyl group, an alkylthio group, an arylthio group, a substituted cyclopentadienyl group, an indenyl group, a substituted indenyl group, fluorenyl group, an amino group, an amide group, an acyloxy group, a phosphide group, a halogen atom, or a chelating agent; $R^{26}$ through $R^{29}$, or $R^{30}$ through $R^{32}$ may be identical to or different from each other; each of u, v, and w is an integer between 0 and 4 inclusive; each of x and y is an integer of 0 and 3 inclusive; and two of $R^{26}$ through $R^{29}$ or $R^{30}$ through $R^{32}$ may be cross-linked by use of $CH_2$ or $Si(CH_3)_2$ to form a complex.

Preferably, each of the metal $M^{11}$ and $M^{12}$ that belongs to Groups 3–6 or the lanthanum group is a metal that belongs to group 4, inter alia, titanium, zirconium, and hafnium. Preferable titanium compounds are represented by the following formula (20):

$$TiR^{33}X^{15}Y^{11}Z^2 \tag{20}$$

wherein $R^{33}$ represents a cyclopentadienyl group, a substituted cyclopentadienyl group, an indenyl group, a substituted indenyl group, or a fluorenyl group, and each of $X^{15}$, $Y^{11}$, and $Z^2$ represents a hydrogen atom, a C1–C20 alkyl group, a C1–C20 alkoxy group, a C6–C20 aryl group, alkylaryl group, arylalkyl group, C6–C20 aryloxy group, C1–C20 acyloxy group, C1–C50 amino group, amide group, phosphide group, alkyl thio group, arylthio group, or a halogen atom. Compounds in which one of $X^{15}$, $Y^{11}$, and $Z^2$ and $R^{33}$ are cross-linked with $CH_2$, $SiR_2$, etc. also fall within the definition of the formula (20) compounds.

Of these titanium compounds, those having no halogen atom are preferred. Particularly, titanium compounds having a single π-electron system ligand as described above are preferred.

Also, as titanium compounds, there may be used condensation titanium compounds represented by the following formula (21):

(21)

wherein each of $R^{34}$ and $R^{35}$ represents a halogen atom, C1–c20 alkoxy group, or an acyloxy group; and z is a number between 2 and 20 inclusive. These titanium compounds may be transformed into complexes by use of esters or ether before use.

Examples of other transition metal compounds which serve as component (a) include those having two conjugate-π-electron-containing ligands, and specifically, mention may be given of at least one compound selected from among the transition metal compounds represented by the following formula (22):

$$M^{13}R^{36}R^{37}R^{38}R^{39} \tag{22}$$

wherein $M^{13}$ represents titanium, zirconium, or hafnium; each of $R^{36}$ and $R^{37}$, which may be identical to or different from each other, represents a cyclopentadienyl group, a substituted cyclopentadienyl group, an indenyl group, or a fluorenyl group; and each of $R^{38}$ and $R^{39}$, which may be identical to or different from each other, represents a hydrogen atom, a halogen atom, a C1–C20 hydrocarbon group, a C1–C20 alkoxy group, an amino group, or a C1–C20 thioalkoxy group, wherein $R^{38}$ and $R^{39}$ may be cross-linked by the mediation of a C1–C5 hydrocarbon group, a C1–C20 alkylsilyl group having 1–5 silicon atoms, or a C1–C20 germanium-containing hydrocarbon group having 1–5 germanium atoms.

(b) (i) oxygen-containing compounds and/or (ii) compounds capable of forming an ionic complex through reaction with a transition metal compound:

Compounds described in relation to the synthesis of ethylene copolymer macromers may be used.

(c) Alkylating agents:

Those described in relation to the synthesis of ethylene copolymer macromers may be used.

<1)-ii> Preparation of Catalysts:

Examples of methods for contacting components (a) and (b) of the catalysts for polymerization with optional component (c) include the following methods (1) through (5). According to method (1), component (c) is added to a mixture of component (a) and component (b) to thereby provide a catalyst. The catalyst is contacted with monomers to be polymerized (i.e., in the present invention, a solution obtained by dissolving macromer (b) in aromatic vinyl monomer (a) or in a solvent containing aromatic vinyl monomer (a)). According to method (2), component (a) is added to a mixture of component (b) and component (c) to thereby provide a catalyst, and the catalyst is contacted with monomers to be polymerized. According to method (3), component (b) is added to a mixture of component (a) and component (c) to thereby provide a catalyst, and the catalyst is contacted with monomers to be polymerized. According to method (4), respective components (a), (b), and (c) are individually contacted with monomer components to be polymerized. According to method (5), a mixture of a monomer component to be polymerized and component (c) with a catalyst prepared by any of the methods (1) through (3).

The above component (a) and component (b) may be contacted with the optional component (c) at the polymerization temperature or in the temperature range of −20 to 200° C.

The catalysts used in polymerization are thus formed of a combination of the aforementioned components (a) and (b), or of a combination of the aforementioned components (a), (b), and (c). Other catalyst components may also be incorporated in the catalyst system. The proportions of respective catalysts may vary in accordance with conditions and thus are not univocally determined. Usually, if the component (b) is an oxygen-containing compound, the mole ratio of component (a) to component (b) is preferably from 1:1 to 1:10,000, more preferably from 1:1 to 1:1,000; if the component (b) is a compound which is capable of forming an ionic complex through reaction with a transition metal compound, the mole ratio of component (a) to component (b) is preferably from 0.1:1 to 1:0.1; and if component (c) is used, the mole ratio of component (a) to component (c) is preferably from 1:0.1 to 1:1,000.

Prior to feeding catalyst components, organic aluminum compounds such as triisobutylaluminum may be added so as to scavenge impurities.

<I)-iii)> Polymerization Methods:

Bulk polymerization may be employed as the polymerization method, and polymerization may be conducted in aliphatic hydrocarbon solvents such as pentane, hexane, or heptane; alicyclic hydrocarbon solvents such as cyclohexane; and aromatic hydrocarbon solvents such as benzene, toluene, xylene, or ethylbenzene. No particular limitation is imposed on the polymerization temperature, and it is typically 0–200° C., preferably 20–100° C.

The proportions of the polymer segment derived from aromatic vinyl monomer (a) and that derived from ethylene copolymer macromer (b) in the final graft copolymerization product may be suitably regulated in accordance with the amounts of aromatic vinyl monomer (a) and macromer (b) which undergo polymerization.

(II) An aromatic vinyl resin composition composed of (A) an aromatic vinyl polymer, (B) an ethylene copolymer having a diene-monomer-derived vinyl group in the molecular chain, and (C) a graft copolymerization product of an aromatic vinyl monomer (a) and an ethylene copolymer macromer (i.e., corresponding to the aforementioned copolymer (I)):

(II-1) Constituent Components of the Composition:

(A) Aromatic Vinyl Polymer:

The aromatic vinyl polymer is obtained through polymerization of the above-described aromatic vinyl monomers in accordance with a known method described, for example, in Japanese Patent Application Laid-Open (kokai) No. 62-104818. Preferably, the aromatic-vinyl-monomer-derived recurrent unit of the polymer has a syndiotactic structure, (B) Ethylene copolymer having a diene-monomer-derived vinyl group in the molecule:

This copolymer is the same ethylene copolymer macromer as described in (I) above.

(C) Graft copolymerization product between aromatic vinyl monomer (a) and ethylene copolymerization macromer (b):

This is the same ethylene copolymer macromer as described in (I) above.

(D) Other components:

Other components may also be arbitrarily selected from among known substances and incorporated as desired. For example, there may be incorporated thermoplastic resins such as polyolefin resins, polystyrene resins, polycarbonate, polyester resins, polyamide resins, polyphenylene ether, and polyphenylene sulfide; and the following substances such as natural rubber, polybutadiene, polyisoprene, polyisobutylene, neoprene, polysulfide rubber, Thiokol rubber, acryl rubber, urethane rubber, silicone rubber, epichlorohydrin rubber, styrene-butadiene block copolymer (SBR), hydrogenated styrene-butadiene block copolymer (SEB), styrene-butadiene-styrene block copolymer (SBS), hydrogenated styrene-butadiene-styrene block copolymer (SEBS), styrene-isoprene block copolymer (SIR), hydrogenated styrene-isoprene block copolymer (SEP), styrene-isoprene-styrene block copolymer (SIS), hydrogenated styrene-isoprene-styrene block copolymer (SEPS), ethylene propylene rubber (EPR), ethylene-α-olefin copolymer rubbers such as ethylene-hexene copolymer and ethylene-octene copolymer, ethylene-styrene copolymer rubber, ethylene-styrene quasi-random copolymer rubber, ethylene-propyrne-diene rubber (EPDM), and core-shell particulate elastomers including butadiene-acrylonitrile-styrene core-shell rubber (ABS), methylmethacrylate-butadiene-styrene core-shell rubber (MBS), methylmethacrylate-butylacrylate-styrene core-shell rubber (ES), octylacrylate-butadiene-styrene core-shell rubber (MABS), alkylacrylate-butadiene-acrylonitrile-styrene core-shell rubber (AABS), butadiene-styrene core-shell rubber (SBR), and siloxane-containing core-shell rubbers led by methacrylate-butylacrylate siloxane. Also, there may be incorporated rubber-like elastic substances having elasticity such as modification products of the above-listed rubbers. Furthermore, there may be incorporated a variety of other types of ingredients in such amounts that the effects of the present invention are not impeded. Examples of such ingredients include inorganic fillers, antioxidants, nucleating agents, plasticizers, mold-releasing agents, flame retardants, flame retardant aids, and antistatic agents.

Examples of inorganic fillers include fibers such as glass fiber, carbon fiber and whiskers; and granular or powdery materials such as talc, carbon black, graphite, titanium dioxide, silica, mica, calcium carbonate, calcium sulfate, barium carbonate, magnesium carbonate, magnesium sulfate, barium sulfate, oxysulfate, tin oxide, alumina, kaolin, silicon carbide, metal powder, glass powder, glass flakes, and glass beads. Of these inorganic fillers, glass fillers are particularly preferred.

The inorganic fillers are preferably surface-treated with a coupling agent (such as a silane coupling agent or titanium coupling agent) or a similar agent so as to obtain enhanced adhesion against the resin.

The inorganic fillers may be used singly or in combination of two or more.

(II-2) Preparation of the Composition:

No particular limitation is imposed on the method for preparing the above-described aromatic vinyl resin composition. The order of addition of components, mixing method, and other conditions may be arbitrarily selected. The composition encompasses those which are obtained through melt-kneading of a component mixture. The method of melt-kneading is not particularly limited, and known methods which are routinely used may be performed.

(II-3) Proportions of the Respective Components in the Composition:

The proportions of the respective components in the composition are as follows. (A): Aromatic vinyl polymer= 0–99% by weight, preferably 0–50% by weight (exclusive of 0 in both cases). (B): Ethylene copolymer having a diene-monomer-derived vinyl group in the molecular chain= 0–50% by weight, preferably 0–30% by weight (exclusive of 0 in both cases). (C): A graft copolymerization product of aromatic vinyl monomer (a) and ethylene copolymer macromer (b)=1–100% by weight, preferably 10–100% by weight (exclusive of 0 in both cases).

If the aromatic vinyl polymer (A) is contained in an amount of more than 99% by weight, sufficient toughness may not be obtained. If the ethylene copolymer having a diene-monomer-derived vinyl group in the molecular chain (B) is contained in an amount of more than 50% by weight, elasticity may decrease and moldability may become poor. If the graft copolymerization product of aromatic vinyl monomer (a) and ethylene copolymer macromer (b) is less than 1% by weight, sufficient toughness may not be obtained.

(III) An aromatic vinyl resin composition composed of an aromatic vinyl resin material as described above in (I) or (II) and a styrene polymer predominantly having a syndiotactic structure and/or a rubber-like elastic material:

(III-1) Constituent Components:

(a) Styrene Compounds Predominantly Having a Syndiotactic Structure:

The term "syndiotactic structure" refers to a structure of a chemical substance which has a syndiotactic stereochemical structure, in which the side chains (phenyl groups) alternate regularly above and below the plane of the backbone (main chain formed of C=C bonds). Quantitative determination of tacticity is carried out through nuclear magnetic resonance using a carbon isotope (13C—NMR). Tacticity as measured through $^{13}$C-NMR is represented by the proportions of a plurality of consecutive constituent units; diad when two constituent units are present, triad when three constituent units are present, and pentad when five constituent units are present. In the present invention, the expression "styrene polymer predominantly having a syndiotactic structure" collectively refers to the following substances which are generally endowed with a syndiotacticity of 75% or more, preferably 85% or more, in the case of racemic diad, or of 30% or more, preferably 50% or more, in the case of racemic pentad: polystyrene, poly (alkylstyrene), poly(halostyrene), poly(haloalkylstyrene), polyalkoxystyrene), poly(vinylbenzoic acid esters), hydrogenated polymers thereof, mixtures thereof, and copolymers containing any of these members as a predominant component. Specific examples of poly(alkylstyrene) include poly (methylstyrene), poly(ethylstyrene), poly(isopropylstyrene), poly(tert-butylstyrene), poly(phenylstyrene), poly (vinylnaphthalene), and poly(vinylstyrene). Specific examples of poly(halostyrene) include poly(chlorostyrene), poly(bromostyrene), and poly(fluorostyrene). Specific examples of poly(haloalkylstyrene) include poly (chloromethylstyrene), and specific examples of poly (alkoxystyrene) include poly(methoxystyrene) and poly (ethoxystyrene).

Of the above-listed styrene polymers, particularly preferred are polystyrene, poly(p-methylstyrene), poly(m-methylstyrene), poly(p-tert-butylstyrene), poly(p-chlorostyrene), poly(m-chlorostyrene), poly(p-fluorostyrene), hydrogenated styrene, and copolymers containing any of these structural units.

The above-described styrene polymers predominantly having a syndiotactic structure may be prepared by known methods. For example, in an inert hydrocarbon solvent (or without use of a solvent), styrene monomers (the monomers that correspond to the styrene polymer of interest) are polymerized by use of a catalyst obtained through condensation of a titanium compound, water, and trialkylaluminum (see, for example, Japanese Patent Application Liad-Open (kokal) No. 62-187708). Also, poly(haloalkylstyrene) and hydrogenated polymers thereof may be prepared by any method described, for example, in Japanese Patent Application Liad-Open (kokai) Nos. 1-46912 and 1-178505.

These styrene polymers predominantly having a syndiotactic structure may be used singly or in combination of two or more.

(b) Rubber-like elastic materials:

Specific examples of rubber-like elastic materials include natural rubber, polybutadiene, polyisoprene, polyisobutylene, neoprene, polysulfide rubber, Thiokol rubber, acryl rubber, urethane rubber, silicone rubber, epichlorohydrin rubber, styrene-butadiene block copolymer (SBR), hydrogenated styrene-butadiene block copolymer (SEB), styrene-butadiene-styrene block copolymer (SBS), hydrogenated styrene-butadiene-styrene block copolymer (SEBS), styrene-isoprene block copolymer (SIN), hydrogenated styrene-isoprene block copolymer (SEP), styrene-isoprene-styrene block copolymer (SIS), hydrogenated styrene-isoprene-styrene block copolymer (SEPS), ethylene propylene rubber (EPR), ethylene-a-olefin copolymer rubbers such as ethylene-hexene copolymer and ethylene-octene copolymer, ethylene-styrene copolymer rubber, ethylene-styrene quasi-random copolymer rubber, ethylene-propyrne-diene rubber (EPDM), and core-shell particulate elastomers including butadiene-acrylonitrile-styrene core-shell rubber (ABS), methylmethacrylate-butadiene-styrene core-shell rubber (MBS), methylmethacrylate-butylacrylate-styrene core-shell rubber (MAS), octylacrylate-butadiene-styrene core-shell rubber (MABS), alkylacrylate-butadiene-acrylonitrile-styrene core-shell rubber (AABS), butadiene-styrene core-shell rubber (SBR), and siloxane-containing core-shell rubbers led by methacrylate-butylacrylate siloxane. Also, there may be used modification products of these rubbers.

Of the listed materials, preferred are olefin-type rubber-like elastic materials, inter alia, those exhibiting rubber elasticity at room temperature and being endowed with elastic recovery of 40 or more, preferably 55 or more, particularly preferably 70 or more. As used herein, the expression "elastic recovery" refers to the value obtained from the following procedure. Briefly, the resin which has been melted at a temperature higher than its melting point is press-formed into film with a cold press. The film is subjected to blanking through use of a blanking die having the S3 size of DIN53504, to thereby obtain a test piece. The test piece is subjected to a tensile test through use of Autograph AG5000B (manufactured by Shimadzu Corp.). Specifically, the test piece is pulled to extend by 100% under conditions in which the initial distance between chucks was 20 mm and the pulling speed was 1 mm/min. Subsequently, the test piece was returned towards the original state at the same but opposite speed, and the strain (%) remaining when the stress reached 0 is measured as a residual strain. The elastic recovery was calculated based on the following equation:

Elastic recovery=100−residual strain (c) Other components:

Other components which are arbitrarily selected from among known ingredients may be incorporated as needed. For specific examples, reference is made to those listed previously.

(III-2) Proportions of the Constituent Components

In the composition system constituted by an aromatic vinyl resin material (I) or (II), and a styrene polymer predominantly having a syndiotactic structure (a) and/or a rubber-like elastic material (b), the blend ratio of the "aromatic vinyl resin material (I) or (II)" to the component(s) "(a) and/or (b)" is arbitrarily determined. The proportions of (a) and (b) are as follows. (a): Aromatic vinyl polymer= 50–97% by weight, preferably 60–95% by weight. (b): Rubber-like elastic material 3–50% by weight, preferably 5–40% by weight, more preferably 10–35% by weight.

If aromatic vinyl polymers are used in amounts less than 10% by weight, sufficient heat resistance and solvent resistance cannot be obtained. On the other hand, amounts in excess of 97% by weight may result in poor toughness. 3. Molded products formed through molding of an aromatic vinyl resin material:

The aromatic vinyl resin materials of the present invention are molded into a variety of molding products. For example, films, sheets, stretched films, and injection-molded products may be formed. The molding method is not limited and any suitable known method may be used.

EXAMPLES

The present invention will next be described in more detail by way of example.

The evaluation methods are as described above.

Tm (melting point) was measured by use of DSC-7 (manufactured by Perkin-Elmer Corp.). First, each sample was heated to 300° C. and allowed to melt for five minutes. Subsequently, the sample was cooled to 50° C. at 20° C./min. and held for one minute at the same temperature. The sample was heated again at 20° C./min and the melting point was measured.

Example 1

(1) Synthesis of Ethylene Copolymer Macromer Having a Vinyl Group Derived from a Diene Monomer in the Molecular Chain.

In a 2-liter pressure-proof polymerization tank were placed dehydrated toluene (206 ml), active-alumina-treated purified styrene (600 ml), active-alumina-treated divinylbenzene (4.5 ml)(manufactured by Nippon Steel Chemical Co., Ltd., high-purity para isomer T-30, p-divinylbenzene content: 70 wt. %), and methylaluminoxane (manufactured by Albemarle) such that an aluminum concentration was 9 mmol. Ethylene was fully dissolved under a constant gauge pressure of 0.6 MPa, and (t-butylamido) dimethyl ($\eta^5$-1,2, 3,4-tetrahydro -9-fluorenyl) silanetitanium dichloride was added thereto such that an aluminum concentration was 15 $\mu$mol. Subsequently, ethylene was subjected to polymerization at 70° C. for 30 minutes under a constant ethylene pressure. After removal of ethylene gas, polymerization was terminated by addition of a small amount of methanol.

The obtained viscous solution was precipitated in methanol, and a polymer was recovered. The polymer was dried at 50° C. under reduced pressure, to thereby obtain an ethylene copolymer (85 g). The composition was confirmed by $^1$H-NMR to be ethylene/styrene/divinylbenzene=78.4/ 21.5/0.1 (mol %).

(2) Graft Copolymerization

In a 500-ml separable flask were placed fully-dehydrated toluene (150 ml) and active-alumina-treated purified styrene (100 ml). The ethylene copolymer macromer (4.0 g) synthesized in procedure (1) above was substituted with nitrogen and added to the mixture under stirring. The. macromer was completely dissolved in the styrene monomer liquid at 50° C.

Next, the solution of ethylene copolymer macromer in styrene was heated to 75° C., and truisobutyl aluminum (1.0 mmol) was added thereto. Subsequently, a titanium-mixed catalyst prepared in advance was added thereto such that a titanium concentration was 5.0 $\mu$mol, and the mixture was subjected to polymerization for 20 minutes under stirring. The mixture ratio of the titanium-mixed catalyst was methylaluminoxane:triisobutyl aluminum:titanium=75:25:1 (mol ratio), and the titanium was in the form of 1,2,3,4,5,6,7,8-octahydrofluorenyltitanium trimethoxide. Polymerization was terminated by addition of a small amount of methanol. The polymer was washed with methanol and dried at 50° C. under reduced pressure for 12 hours, to thereby obtain a polymer (yield: 27.0 g).

The thus-obtained graft copolymerization product has a total ethylene copolymer macromer content of 15 wt. %. The product was dried, melted at 300° C., shaped into a strand, and pelletized.

The results are shown in Table 1.

TABLE 1

|  | Tm (° C.) | Tensile elongation (%) | G' (1.0) | G' (0.1) | SG value |
|---|---|---|---|---|---|
| Example 1 | 270 | 44 | 1105 | 567 | 0.29 |
| Example 2 | 271 | 72 | 5040 | 3108 | 0.21 |
| Example 3 | 270 | 48 | 1044 | 500 | 0.32 |
| Comparative Example 1 | 270 | 2 | 2.03 | 1.60 | 1.27 |
| Comparative Example 2 | 270 | 4 | 805 | 104 | 0.89 |
| Comparative Example 3 | 270 | 5 | 682 | 136 | 0.70 |

Example 2

The procedure of Example 1 was repeated except that copolymerization of ethylene copolymer macromer and styrene in the step "(2) Graft copolymerization" was performed for 5 minutes instead of 20 minutes. The thus-obtained graft copolymerization product has a total ethylene copolymer macromer content of 37 wt. %.

Also, the polymerized polymer was treated in the same manner as in Example 1.

The results are shown in Table 1.

Example 3

(1) Synthesis of Ethylene Copolymer having a Vinyl Group- Derived from a Diene Monomer in the Molecular Chain In a 1-liter pressure-proof polymerization tank were placed dehydrated toluene (250 ml), active-alumina-treated p-divinylbenzene (0.6 ml)(manufactured by Nippon Steel Chemical Co., Ltd., high-purity para isomer T-30), and methylaluminoxane (manufactured by Albemarle) such that an aluminum concentration was 7.5 mmol. A mixture gas of ethylene and propylene (mol ratio of 8:2) was fed thereinto under a gauge pressure of 0.6 MPa, and a steady state was attained. Thereafter, (t-butylaido)dimethyl($\eta^5$-1,2,3,4-tetrahydro-9-fluorenyl)silanetitanium dichloride was added thereto such that titanium concentration was 7.5 $\mu$mol, followed by polymerization at 70° C. for 30 minutes under a constant pressure. After removal of a gaseous monomer, Polymerization was terminated by addition of a small amount of methanol.

The thus-obtained viscous solution was precipitated in methanol, and a polymer was collected. The polymer was dried at 50° C. under reduced pressure, to thereby obtain an ethylene copolymer (26 g).

(2) Graft Copolymerization

The procedure of Example 1 was repeated. The thus-obtained graft copolymerization product has a total ethylene copolymer macromer content of 22 wt. %.

The product was dried, melted at 300° C., shaped into a strand, and pelletized.

The results are shown in Table 1.

Comparative Example 1

The procedure of Example 1 was performed except that no ethylene copolymer macromer was added and a styrene monomer was mixed in advance in toluene at 80° C. in the step "(2) Graft copolymerization." The same titanium-mixed catalyst as used in Example 1 (2) was added such that a titanium concentration was 5.0 $\mu$mol, followed by polymerization for 20 minutes. Polymerization was terminated by addition of a small amount of methanol, and the polymer was washed twice in methanol, each time for 30 minutes.

After filtration, the polymer was dried at 200° C. for two hours under reduced pressure, to thereby obtain syndiotactic polystyrene (SPS)(24.5 g).

The results are shown in Table 1.

Comparative Example 2

To SPS used in Comparative Example 1 was added 20 wt. % ethylene-propylene rubber (EP-01P manufactured by Japan Synthetic Rubber Co., Ltd.), and the mixture was shaped into a strand and pelletized at 300° C.

The results are shown in Table 1.

Comparative Example 3

To SPS used in Comparative Example 1 were added 10 wt. % ethylene-propylene rubber (EP-01P manufactured by Japan Synthetic Rubber Co., Ltd.) and 10 wt. % SEBS (G1651 manufactured by Shell Japan Ltd.), and the mixture was shaped into a strand and pelletized at 300° C.

The results are shown in Table 1.

Example 4

(2) Graft Copolymerization

In a 1-liter separable flask were placed ethylene copolymer macromer (12.0 g) synthesized in Example 1 (2), fully-dehydrated toluene (400 ml) and active-alumina-treated purified styrene (100 ml), and the ethylene-copolymer macromer was completely dissolved. There was added thereto a mixture of previously-prepared 1,2,3,4,5,6,7,8-octahydrofluorenyltitanium trimethoxide such that a titanium concentration was 18 $\mu$mol, methylaluminoxane (manufactured by Albemarle) such that an aluminum concentration was 1.7 mmol, triisobutyl aluminum (380 $\mu$mol) (manufactured by TOSOB AKZO CORPORATION), followed by polymerization at 75° C. for 15 minutes under nitrogen. Polymerization was terminated by addition of a small amount of methanol. The polymer was washed with methanol and dried at 60° C. The yield of the polymer was 48.4 g.

Using the resultant polymer, $^1$H-NMR analysis was performed on the residue taken up with boiling cyclohexane. B/A was confirmed to be 0.26 (wherein A is an integrated value of a peak appearing at 1.0–1.7 (ppm) and B is an integrated value of a peak appearing at 1.8–2.1 (ppm)), B/A in the eluted fractions at 50° C. or more through fractionation with o-dichlorobenzene (ODCB) was confirmed to be 0.27 (wherein A and B are as described above; the same applies hereinafter), B/A in the eluted fractions at 110° C. or more through the same was confirmed to be 0.28, and B/A in the eluted fractions at 125° C. or more through the same was confirmed to be 0.29.

Further, the obtained polymer was melted at 300° C. and shaped into a strand, to thereby obtain pellets of the polymer. The polymer had a heat of fusion $\Delta$H of 21.1 (J/g) over the range 200–295° C. as measured by use of a differential scanning calorimeter, a tensile elongation of 96%, an internal haze of 25.9%, and the mean diameter of the domain components obtained through light scattering method was 0.6 $\mu$m. Also, the SG value was 0.32.

Example 5

The procedure of Example 4 was repeated except that the amount of copolymer macromer synthesized in Example 1 (2) was 4.0 g, that of 1,2,3,4,5,6,7,8-octahydrofluorenyltitanium trimethoxide was such that titanium concentration was 5 $\mu$mol, that of methylaluminoxane was such that aluminum concentration was 0.6 mmol, and that of triisobutyl aluminum was 125 $\mu$mol. The yield was 21.6 g.

Using the resultant polymer, $^1$H-NMR analysis was performed on the residue taken up with boiling cyclohexane. B/A was confirmed to be 0.34 (wherein A and B are as described above), and B/A in the eluted fractions at 125° C. or more through fractionation with o-dichlorobenzene (ODCB) was confirmed to be 0.35.

Further, the obtained polymer was melted at 300° C. and shaped into a strand, to thereby obtain pellets of the polymer. The polymer had a heat of fusion $\Delta$H of 23.4 (J/g) over the range 200–295° C. as measured by use of a differential scanning calorimeter, a tensile elongation of 27%, an internal haze of 27.8%, and the mean diameter of the domain components obtained through light scattering method was 0.6 $\mu$m. Also, the SG value was 0.57.

Example 6

(1) Synthesis of Ethylene Copolymer Having a Vinyl Group Derived from a Diene Monomer in the Molecular Chain In a 2-liter pressure-proof polymerization tank were placed dehydrated toluene (500 ml), active-alumina-treated purified styrene (930 ml), active-alumina-treated divinylbenzene (10.5 ml)(manufactured by Nippon Steel Chemical Co., Ltd., high-purity para isomer T-30, p-divinylbenzene content: 70 wt. %), methylaluminoxane (manufactured by Albemarle) such that an aluminum concentration was 18 mmol, and triisobutyl aluminum (manufactured by TOSOH AKZO CORPORATION) such that an aluminum concentration was 0.5 mmol. Ethylene was fully melted under a constant pressure of 0.6 MPa, and (t-butylamido) dimethyl ($\eta^5$-1,2,3,4-tetrahydro-9-fluorenyl) silanetitanium dichloride was added thereto such that a titanium concentration was 30 µmol. Subsequently, ethylene was subjected to polymerization at 70° C. for 90 minutes under a constant ethylene pressure. After removal of ethylene gas, polymerization was terminated by addition of a small amount of methanol.

The obtained viscous solution was precipitated in methanol, and a polymer was recovered. The polymer was dried at 50° C. under reduced pressure, to thereby obtain an ethylene copolymer (115.3 g).

The composition was confirmed by $^1$H-NMR to be ethylene/styrene/divinylbenzene=71.1/28.6/0.4 (mol %).

(2) Graft Copolymerization

In a 5-liter polymerization tank were placed ethylene copolymer macromer (100 g) synthesized in step (1) above, fully-dehydrated toluene (1500 ml), and active-alumina-treated purified styrene (1500 ml), and the ethylene copolymer macromer was completely dissolved. There was added thereto a mixture of previously-prepared 1,2,3,4,5,6,7,8-octahydrofluorenyltitanium trimethoxide such that a titanium concentration was 200 µmol, methylaluminoxane (manufactured by Albemarle) such that an aluminum concentration was 22 mmol, and triisobutyl aluminum (5 mmol) (manufactured by TOSOH AKZO CORPORATION), followed by polymerization at 75° C. for 90 minutes under nitrogen. Polymerization was terminated by addition of a small amount of methanol. The polymer was washed with methanol and dried at 60° C. The yield of the polymer was 570 g.

Using the resultant polymer, $^1$H-NMR analysis was performed on the residue taken up with boiling cyclohexane. B/A was confirmed to be 0.37, and B/A in the eluted fractions at 125° C. or more through fractionation with o-dichlorobenzene (ODCB) was confirmed to be 0.38.

Further, the obtained polymer was melted at 300° C. and shaped into a strand, to thereby obtain pellets of the polymer. The polymer had a heat of fusion ΔH of 25.8 (J/g) over the range 200–295° C. as measured by use of a differential scanning calorimeter, a tensile elongation of 37%, an internal haze of 15.7%, and the mean diameter of the domain components obtained through light scattering method was 0.3 µm. Also, the SG value was 0.22.

Example 7

(1) Synthesis of Ethylene Copolymer Having a Vinyl Group Derived from a Diene Monomer in the Molecular Chain In a 1-liter pressure-proof polymerization tank were placed dehydrated toluene (200 ml), p-(3-butenyl)styrene (40 mmol), methylaluminoxane (manufactured by Albemarle) such that an aluminum concentration was 5 mmol, and triisobutyl aluminum (manufactured by TOSOH AKZO CORPORATION) such that an aluminum concentration was 0.5 mmol. The mixture was regulated such that the flow ratio of ethylene to propylene was 7:2 and the gauge pressure was 0.9 MPa. Ethylenebis-. 1,1'-indenylzirconium dichloride was added thereto such that a zirconium concentration was 2 µmol, followed by polymerization at 30° C. for 15 minutes.

After removal of the inert gas, polymerization was terminated by addition of a small amount of methanol.

The thus-obtained viscous solution was precipitated in methanol, and a polymer was recovered. The polymer was dried at 50° C. under reduced pressure, to thereby obtain an ethylene copolymer (27.0 g).

The composition was confirmed by $^1$H-NM to be ethylene/propylene/3-butenylstyrene=81.3/18.2/0.5 (mol %).

(2) Graft Copolymerization

In a 500-ml separable flask were placed ethylene copolymer macromer (4.0 g) synthesized in step (1) above, fully-dehydrated toluene (150 ml), and active-alumina-treated purified styrene (100 ml), and the ethylene copolymer macromer was completely dissolved. There was added thereto a mixture of previously-prepared 1,2,3,4,5,6,7,8-octahydrofluorenyltitanium trimethoxide such that a titanium concentration was 7.5 µmol, methylaluminoxane (manufactured by Albemarle) such that an aluminum concentration was 830 µmol, and triisobutyl aluminum (190 µmol)(manufactured by TOSOH AKZO CORPORATION), followed by polymerization at 65° C. for 7 minutes under nitrogen. Polymerization was terminated by addition of a small amount of methanol. The polymer was washed with methanol and dried at 60° C. The yield of the polymer was 18.0 g.

According to the analysis by $^1$H-NMR performed on the residue taken up with boiling cyclohexane, B/A was confirmed to be 0.30, and B/A in the eluted fractions at 125° C. or more through fractionation with o-dichlorobenzene (ODCB) was confirmed to be 0.31.

Further, the obtained polymer was melted at 300° C. and shaped into a strand, to thereby obtain pellets of the polymer. The polymer had a heat of fusion ΔH of 21.1 (J/g) over the range 200–295° C. as measured by use of a differential scanning calorimeter, a tensile elongation of 68%, an internal haze of 14.3%, and the mean diameter of the domain components obtained through light scattering method was 0.3 µm.

Comparative Example 4

(1) Synthesis of Ethylene Copolymer Having no Vinyl Group Derived from a Diene Monomer in the Molecular Chain In a 1-liter pressure-proof polymerization tank were placed dehydrated toluene (90 ml), active-alumina-treated purified styrene (210 ml), and methylaluminoxane (manufactured by Albemarle) such that an aluminum concentration was 4.5 mmol. Ethylene was fully melted under a constant pressure of 0.6 MPa, and (t-butylamido)dimethyl ($\eta^5$-1,2,3,4-tetrahydro-9-fluorenyl)silanetitanium dichloride was added thereto such that a titanium concentration was 7.5 µmol. Subsequently, ethylene was subjected to polymerization at 70° C. for 30 minutes under a constant ethylene pressure. After removal of ethylene gas, polymerization was terminated by addition of a small amount of methanol.

The thus-obtained viscous solution was precipitated in methanol, and a polymer was recovered. The polymer was dried at 50° C. under reduced pressure, to thereby obtain an ethylene copolymer (29.7 g).

The composition was confirmed by $^1$H-NMR to be ethylene/styrene=79.6/20.4 (mol %).

(2) Graft Copolymerization

In a 500-ml separable flask were placed ethylene copolymer macromer (4.0 g) synthesized in step (1) above, fully-dehydrated toluene (200 ml), and active-alumina-treated purified styrene (50 ml), and the ethylene copolymer macromer was completely dissolved. There was added thereto a mixture of previously-prepared 1,2,3,4,5,6,7,8-octahydrofluorenyltitanium trimethoxide such that a titanium concentration was 7.5 μmol, methylaluminoxane (manufactured by Albemarle) such that an aluminum concentration was 630 μmol, and triisobutyl aluminum (190 μmol) (manufactured by TOSOH AKZO CORPORATION), followed by polymerization at 65° C. for 15 minutes under nitrogen. Polymerization was terminated by addition of a small amount of methanol. The polymer was washed with methanol and dried at 60° C. The yield of the polymer was 19.9 g.

According to the analysis by $^1$H-NMR performed on the residue taken up with boiling cyclohexane, B/A was confirmed to be 0.50, and B/A in the eluted fractions at 125° C. or more through fractionation with o-dichlorobenzene (ODCB) was confirmed to be 0.50.

Further, the obtained polymer was melted at 300° C. and shaped into a strand, to thereby obtain pellets of the polymer. The polymer had a heat of fusion ΔH of 21.5 (J/g) over the range 200–295° C. as measured by use of a differential scanning calorimeter, a tensile elongation of 3.8%, an internal haze of 87.1%, and the mean diameter of the domain components obtained through light scattering method was 2.4 μm.

Comparative Example 5

The procedure of Example 4 was repeated except that styrene-butadiene block copolymer (4.0 g)(NS312S manufactured by Nippon Zeon Co., Ltd.) was used in step (2) instead of ethylene copolymer synthesized in step (1), to thereby obtain a polymer (20.1 g).

According to the analysis by $^1$H-NMR performed on the residue taken up with boiling cyclohexane, B/A was confirmed to be 0.50, and B/A in the eluted fractions at 125° C. or more through fractionation with o-dichlorobenzene (ODCB) was confirmed to be 0.50.

Further, the obtained polymer was melted at 300° C. and shaped into a strand, to thereby obtain pellets of the polymer. The polymer had a heat of fusion ΔH of 21.5 (J/g) over the range 200-295° C. as measured by use of a differential scanning calorimeter, a tensile elongation of 4.8%, and an internal haze of 75.7%. However, the mean diameter of the domain components obtained through light scattering method could not be measured, since microphase separation occurred in the polymer itself.

Comparative Example 6

The procedure of Example 4 was repeated except that ethylene-propylene copolymer (4.0 g)(EPO1 manufactured by JSR) was used in step (2) instead of ethylene copolymer synthesized in step (1), to thereby obtain a polymer (21.1 g).

According to the analysis by $^1$H-NMR performed on the residue taken up with boiling cyclohexane, B/A was confirmed to be 0.50, and B/A in the eluted fractions at 125° C. or more through fractionation with o-dichlorobenzene (ODCB) was confirmed to be 0.50.

Further, the obtained polymer was melted at 300° C. and shaped into a strand, to thereby obtain pellets of the polymer. The polymer had a heat of fusion ΔH of 22.5 (J/g) over the range 200-295° C. as measured by use of a differential scanning calorimeter, a tensile elongation of 3.8%, an internal haze of 85.3%, and the mean diameter of the domain components obtained through light scattering method was 2.8 μm.

Example 8

Graft copolymer obtained in Example 3, SPS used in Comparative Example 1, and ethylene-propylene rubber (EP-01P manufactured by Japan Synthetic Rubber Co., Ltd.) were mixed at the weight ratio of 50:40:10. The mixture was kneaded at 300° C. by use of a biaxial extruder (LABO-PIASTMILL manufactured by Toyo Seiki Co., Ltd.), to thereby obtain pellets of the polymer. The polymer had a tensile elongation of 25%.

As described above, the present invention satisfactorily provides aromatic vinyl resin materials which are endowed with heat resistance, solvent resistance, toughness, tensile elongation, and transparency, as well as molded products of the resin materials.

What is claimed is:

1. An aromatic vinyl resin material which satisfies the relationship represented by the following expression:

$$SG \text{ value} = \log[G'(1.0)/G'(0.1)] < 0.6$$

wherein G' (1.0) is a storage modulus as measured at a temperature of 300° C., a strain γ of 20%, and a frequency of 1.0 Hz, and G'(0.1) is a storage modulus as measured at a temperature of 300° C., a strain γ of 20%, and a frequency of 0.1Hz.

2. An aromatic vinyl resin material according to claim 1, which is a graft copolymerization product of an aromatic vinyl monomer (a) and an ethylene copolymer macromer (b).

3. An aromatic vinyl resin material according to claim 2, wherein the ethylene copolymer macromer (b) is a copolymerization product of ethylene, a diene monomer, and an optional aromatic vinyl monomer and optional α-olefin.

4. An aromatic vinyl resin material as described above in claim 1, which has a composition composed of (A) an aromatic vinyl polymer, (B) an ethylene copolymer having a diene-monomer-derived vinyl group in the molecular chain, and (C) a graft copolymerization product of an aromatic vinyl monomer (a) and an ethylene copolymer macromer (b).

5. An aromatic vinyl resin material according to claim 2, in which a moiety derived from an aromatic vinyl monomer predominantly has a syndiotactic structure.

6. An aromatic vinyl resin material according to claim 3, in which a moiety derived from an aromatic vinyl monomer predominantly has a syndiotactic structure.

7. An aromatic vinyl resin material according to claim 4, in which a moiety derived from an aromatic vinyl monomer predominantly has a syndiotactic structure.

8. An aromatic vinyl resin material having a composition composed of an aromatic vinyl resin material according to claim 1 and a styrene polymer predominantly having a syndiotactic structure and/or a rubber-like elastic substance.

9. A molded product obtained through molding of an aromatic vinyl resin material as described in claim 1.

10. An aromatic vinyl resin material having the following properties:

1) the heat of fusion ΔH as measured over the range 200–295°C. with a differential scanning calorimeter is 8 to 50 (J/g), 2) in $^1$H-NMR performed on the residue obtained from Soxhlet extraction using cyclohexane,

B/A<0.49 wherein A is an integrated value of a peak appearing at 1.0–1.7 (ppm) and B is an integrated value of a peak appearing at 1.8–2.1 (ppm), 3) a tensile elongation of not less than 5%, and 4) internal haze is not greater than 70%.

11. An aromatic vinyl resin material having the following properties:

1) the heat of fusion ΔH as measured over the range 200–295°C. with a differential scanning calorimeter is 8 to 50 (J/g), 2) in $^1$H-NMR performed on the fraction eluted at 50°C. or higher through preparative temperature-gradient fractionation by use of o-dichlorobenzene

B/A<0.49 wherein A is an integrated value of a peak appearing at 1.7–1.7 (ppm) and B is an integrated value of a peak appearing at 1.8–2.1 (ppm), 3) a tensile elongation of not less than 5%, and 4) internal haze is not greater than 70%.

* * * * *